(12) United States Patent
Kawaguchi

(10) Patent No.: US 11,258,384 B2
(45) Date of Patent: Feb. 22, 2022

(54) MOTOR CONTROL CIRCUIT, MOVEMENT, AND ELECTRONIC TIMEPIECE

(71) Applicant: Seiko Epson Corporation, Tokyo (JP)

(72) Inventor: Takashi Kawaguchi, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/367,342

(22) Filed: Mar. 28, 2019

(65) Prior Publication Data

US 2019/0305702 A1 Oct. 3, 2019

(30) Foreign Application Priority Data

Mar. 29, 2018 (JP) .............................. JP2018-065941

(51) Int. Cl.
*H02P 8/02* (2006.01)
*G04C 3/14* (2006.01)

(52) U.S. Cl.
CPC . *H02P 8/02* (2013.01); *G04C 3/14* (2013.01)

(58) Field of Classification Search
None
See application file for complete search history.

(56) References Cited

U.S. PATENT DOCUMENTS

| 4,542,329 | A | * | 9/1985 | Tu Xuan | G04C 3/143 310/49.24 |
|---|---|---|---|---|---|
| 5,247,235 | A | * | 9/1993 | Tu | G04C 3/143 318/400.04 |
| 5,485,070 | A | * | 1/1996 | Tominaga | H02P 8/12 318/599 |
| 5,504,408 | A | * | 4/1996 | Tu | H02P 8/38 318/685 |
| 5,563,486 | A | * | 10/1996 | Yamamoto | G01C 22/02 318/696 |
| 5,717,320 | A | * | 2/1998 | Heeringa | H02M 7/217 323/282 |
| 5,877,608 | A | * | 3/1999 | Corbin | H02P 8/12 318/685 |

(Continued)

FOREIGN PATENT DOCUMENTS

| JP | H02-033108 B2 | 7/1990 |
|---|---|---|
| JP | 2009-542186 A | 11/2009 |

(Continued)

*Primary Examiner* — Muhammad S Islam
*Assistant Examiner* — Devon A Joseph
(74) *Attorney, Agent, or Firm* — Harness, Dickey & Pierce, P.L.C.

(57) ABSTRACT

A motor control circuit includes a driver having ON and OFF states, and outputs a drive signal to a coil of a motor, a lower limit detector detecting whether current flowing through the coil is less than a lower limit, an upper limit detector detecting whether current flowing through the coil is more than an upper limit, a drive controller placing the driver into the ON state based on a detection result in the lower limit detector after the driver is brought into the OFF state, and placing the driver into the OFF state when the upper limit detector detects that the current is more than the upper limit after a predetermined time elapses from the driver being placed in the ON state, and a polarity switcher switching a polarity of the drive signal when an OFF time of the driver satisfies a polarity switching condition.

6 Claims, 19 Drawing Sheets

(56) References Cited

U.S. PATENT DOCUMENTS

| | | | | |
|---|---|---|---|---|
| 6,072,752 | A * | 6/2000 | Igarashi | G04C 3/14 368/187 |
| 6,265,891 | B1 * | 7/2001 | Yamada | H02H 7/0844 318/490 |
| 7,388,812 | B2 * | 6/2008 | Nakamura | G04R 20/08 368/47 |
| 10,511,248 | B2 * | 12/2019 | Saito | H02P 25/066 |
| 2003/0174584 | A1 * | 9/2003 | Fujisawa | G04R 20/10 368/47 |
| 2003/0198140 | A1 * | 10/2003 | Shimizu | G04R 20/12 368/47 |
| 2010/0001673 | A1 | 1/2010 | Cardoletti et al. | |
| 2016/0114687 | A1 * | 4/2016 | Ichikawa | H02J 7/025 701/22 |
| 2016/0276967 | A1 * | 9/2016 | Kawaguchi | G04C 3/146 |
| 2017/0277130 | A1 * | 9/2017 | Saito | H02P 8/02 |
| 2017/0310256 | A1 | 10/2017 | Zheng | |

FOREIGN PATENT DOCUMENTS

| | | |
|---|---|---|
| JP | 2017-200431 A | 11/2017 |
| WO | WO-2008-003709 A1 | 1/2008 |

\* cited by examiner

MOTOR CONTROL CIRCUIT, MOVEMENT, AND ELECTRONIC TIMEPIECE

The present application is based on, and claims priority from Japanese Patent Application Serial Number 2018-065941, filed Mar. 29, 2018, the disclosure of which is hereby incorporated by reference herein in its entirety.

BACKGROUND

1. Technical Field

The present disclosure relates to a motor control circuit, a movement, and an electronic timepiece.

2. Related Art

There is a technique in which the supply of a current to a coil of a motor is turned on and off between two threshold values of a current flowing through the coil, a position of a rotor of the motor is estimated on the basis of an ON time or an OFF time thereof, and thus rotation of the motor is controlled.

In such a rotation control method, polarity switching is performed according to any of the following three patterns.

In a first method, the maximum threshold value and the minimum threshold value of a current are set to be constant, driving of a motor is turned on and off therebetween, and a timing of switching a polarity is determined on the basis of both an ON period and an OFF period.

In a second method, the maximum threshold value of a current and an OFF period are set to be constant, and a timing of switching a polarity is determined on the basis of an ON period.

In a third method, the minimum threshold value of a current and an ON period are set to be constant, and a timing of switching a polarity is determined on the basis of an OFF period.

JP-T-2009-542186 is an example of the related art.

Among the first to third methods, the second or third method is advantageous in that only an ON period or an OFF period is used as a variable in order to simplify a configuration of a control circuit.

However, in a state in which a current waveform rapidly rises or falls, a drive unit may be frequently turned on and off, and thus current consumption may increase due to a through-current or a charge/discharge current generated at that time.

SUMMARY

An advantage of some aspects of the present disclosure is to provide a motor control circuit, a movement, and an electronic timepiece capable of simplifying a configuration of a control circuit and thus reducing current consumption.

A movement according to an aspect of the present disclosure includes a drive unit that has an ON state and an OFF state, and outputs a drive signal to a coil of a motor so as to drive the motor; a lower limit detection unit that detects that a current flowing through the coil is less than a lower limit current value; an upper limit detection unit that detects that a current flowing through the coil is more than an upper limit current value; a drive control unit that brings the drive unit into the ON state on the basis of a detection result in the lower limit detection unit after the drive unit is brought into the OFF state, and brings the drive unit into the OFF state in a case where the upper limit detection unit detects that the current flowing through the coil is more than the upper limit current value after a predetermined time elapses from the ON state of the drive unit; and a polarity switching unit that switches a polarity of the drive signal in a case where an OFF time which is an elapsed time from the OFF state of the drive unit satisfies a polarity switching condition.

According to the aspect of the present disclosure, the drive control unit does not bring the drive unit into the OFF state at the time at which a current flowing through the coil exceeds the upper limit current value before a predetermined time elapses, and brings the drive unit into the OFF state after the predetermined time elapses. Thus, at least the predetermined time as an ON time which is an elapsed time from the ON state of the drive unit is secured, and thus it is possible to prevent the drive unit from being brought into the OFF state in a short period of time. Therefore, a switching frequency of the ON state and the OFF state of the drive unit can be reduced, and thus current consumption can be reduced, compared with a case where drive unit is controlled to be brought into the ON state and the OFF state through mere comparison between the current, and the upper limit current value and the lower limit current value.

A polarity switching timing is determined on the basis of an OFF time which is an elapsed time from the OFF state of the drive unit, and a configuration of a control circuit can be simplified. For example, in a motor having a bipolar rotor, in a case where a rotation angle of a rotor is about 180° at which a polarity of a drive signal is switched, a rising time of a current is shortened, and an ON time is substantially fixed to the minimum value (predetermined time). Thus, a polarity switching timing can be determined on the basis of only an OFF time in the same manner as in the third method.

Consequently, it is possible to implement a movement capable of simplifying a configuration of a control circuit and thus reducing current consumption.

A movement according to another aspect of the present disclosure includes a drive unit that has an ON state and an OFF state, and outputs a drive signal to a coil of a motor so as to drive the motor; a lower limit detection unit that detects that a current flowing through the coil is less than a lower limit current value; an upper limit detection unit that detects that a current flowing through the coil is more than an upper limit current value; a drive control unit that brings the drive unit into the ON state in a case where the lower limit detection unit detects that the current flowing through the coil is less than the lower limit current value after a predetermined time elapses from the OFF state of the drive unit, and brings the drive unit into the OFF state in a case where the upper limit detection unit detects that the current flowing through the coil is more than the upper limit current value after the drive unit is brought into the ON state; and a polarity switching unit that switches a polarity of the drive signal in a case where an ON time which is an elapsed time from the ON state of the drive unit satisfies a polarity switching condition.

According to the aspect of the present disclosure, the drive control unit does not bring the drive unit into the ON state at the time at which a current flowing through the coil is less than the lower limit current value before a predetermined time elapses, and brings the drive unit into the ON state after the predetermined time elapses. Thus, at least the predetermined time as an OFF time which is an elapsed time from the OFF state of the drive unit is secured, and thus it is possible to prevent the drive unit from being brought into the ON state in a short period of time. Therefore, a switching frequency of the ON state and the OFF state of the drive unit can be reduced, and thus current consumption can be reduced, compared with a case where drive unit is controlled to be brought into the ON state and the OFF state through mere comparison between the current, and the upper limit current value and the lower limit current value.

A polarity switching timing is determined on the basis of an ON time which is an elapsed time from the ON state of the drive unit, and a configuration of a control circuit can be simplified. For example, in a motor having a bipolar rotor, in a case where an ON time is not restricted, and a rotation angle of a rotor is about 180° at which a polarity of a drive signal is switched, an OFF time is short, and thus the OFF time is substantially fixed to the minimum value (predetermined time). Thus, a polarity switching timing can be determined on the basis of only an ON time in the same manner as in the second method.

Consequently, a configuration of a control circuit can be simplified, and thus it is also possible to implement a movement capable of reducing current consumption.

In the movement according to the aspect of the present disclosure, the polarity switching unit may determine that the polarity switching condition is satisfied in a case where the OFF time is longer than a first setting time.

In a case where a rotor is rotated by one step by controlling the drive unit to have the ON state and the OFF state such that a plurality of drive signals are input to the coil, a rotation angle of the rotor is in conjunction with an OFF time of the drive unit, the OFF time of the drive unit is short at the time of starting rotation of the rotor, and the OFF time is lengthened as rotation of the rotor comes close to an end. Therefore, it can be determined that rotation of the rotor corresponding to one step is finished at the time at which the OFF time of the drive unit is longer than the first setting time. Since a polarity of a drive signal is switched at this timing, the rotor can be further rotated by one step through the next-step driving of the motor.

In the movement according to the aspect of the present disclosure, the polarity switching unit may determine that the polarity switching condition is satisfied in a case where the ON time is shorter than a second setting time.

In a case where a rotor is rotated by one step by controlling the drive unit to have the ON state and the OFF state such that a plurality of drive signals are input to the coil, a rotation angle of the rotor is in conjunction with an ON time of the drive unit, the ON time of the drive unit is long at the time of starting rotation of the rotor, and the ON time is shortened as rotation of the rotor comes close to an end. Therefore, it can be determined that rotation of the rotor corresponding to one step is finished at the time at which the ON time of the drive unit is shorter than the second setting time. Since a polarity of a drive signal is switched at this timing, the rotor can be further rotated by one step through the next-step driving of the motor.

In the movement according to the aspect of the present disclosure, the polarity switching unit may not switch a polarity of the drive signal in a case where an elapsed time from the time of starting driving is shorter than a predetermined time, or the number of times of switching between the ON state and the OFF state of the drive unit from the time of starting driving is smaller than a predetermined number of times.

Since a burden is imposed in order to drive a stopped rotor right after the motor starts to be driven, the polarity switching condition may be temporarily satisfied before rotation of the rotor corresponding to one step is completed. In the aspect of the present disclosure, the polarity switching unit does not switch a polarity of the drive signal before a predetermined time elapses from the time of starting driving or in a case where the number of times of switching between the ON state and the OFF state of the drive unit is smaller than a predetermined number of times. Therefore, it is possible to prevent a wrong operation in which polarity switching is performed in a state in which rotation of the rotor corresponding to one step is not completed since the polarity switching condition is temporarily satisfied.

In the movement according to the aspect of the present disclosure, the polarity switching unit may not switch a polarity of the drive signal in a case where an elapsed time from the time of switching a polarity is shorter than a predetermined time, or the number of times of switching between the ON state and the OFF state of the drive unit from the time of switching a polarity is smaller than a predetermined number of times.

The polarity switching condition may be temporarily satisfied before rotation of the rotor corresponding to one step is completed right after switching of a polarity of the drive signal for the motor is started, depending on conditions. In the aspect of the present disclosure, the polarity switching unit does not switch a polarity of the drive signal before a predetermined time elapses from the time of switching a polarity or in a case where the number of times of switching between the ON state and the OFF state of the drive unit is smaller than a predetermined number of times. Therefore, it is possible to prevent a wrong operation in which polarity switching is performed in a state in which rotation of the rotor corresponding to one step is not completed since the polarity switching condition is temporarily satisfied.

An electronic timepiece according to still another aspect of the present disclosure includes the movement.

The electronic timepiece includes the movement, and thus it is possible to implement an electronic timepiece capable of simplifying a configuration of a control circuit and thus reducing current consumption.

A motor control circuit according to still another aspect of the present disclosure includes a drive unit that has an ON state and an OFF state, and outputs a drive signal to a coil of a motor so as to drive the motor; a lower limit detection unit that detects that a current flowing through the coil is less than a lower limit current value; an upper limit detection unit that detects that a current flowing through the coil is more than an upper limit current value; a drive control unit that brings the drive unit into the ON state on the basis of a detection result in the lower limit detection unit after the drive unit is brought into the OFF state, and brings the drive unit into the OFF state in a case where the upper limit detection unit detects that the current flowing through the coil is more than the upper limit current value after a predetermined time elapses from the ON state of the drive unit; and a polarity switching unit that switches a polarity of the drive signal in a case where an OFF time which is an elapsed time from the OFF state of the drive unit satisfies a polarity switching condition.

A motor control circuit according to still another aspect of the present disclosure includes a drive unit that has an ON state and an OFF state, and outputs a drive signal to a coil of a motor so as to drive the motor; a lower limit detection unit that detects that a current flowing through the coil is less than a lower limit current value; an upper limit detection unit that detects that a current flowing through the coil is more than an upper limit current value; a drive control unit that brings the drive unit into the ON state in a case where the lower limit detection unit detects that the current flowing through the coil is less than the lower limit current value after a predetermined time elapses from the OFF state of the drive unit, and brings the drive unit into the OFF state in a case where the upper limit detection unit detects that the current flowing through the coil is more than the upper limit current value after the drive unit is brought into the ON state; and a polarity switching unit that switches a polarity of the drive signal in a case where an ON time which is an elapsed time from the ON state of the drive unit satisfies a polarity switching condition.

DESCRIPTION OF EXEMPLARY EMBODIMENTS

Hereinafter, with reference to the drawings, embodiments of the present disclosure will be described.

First, a theory of motor drive control to which the present disclosure is applied will be described.

In a case where control is performed such that, when a current flowing through a motor exceeds an upper limit current value Imax, a drive unit is turned off, and when the current is less than a lower limit current value Imin, the drive unit is turned on, assuming that a difference between Imax and Imin is sufficiently smaller than a current value of Imax or Imin, a voltage Vc of both ends of a coil, a coil resistance R, an inductance L of the coil, a drive current i, and an induced voltage V have a relationship of $Vc = R*i + L*di/dt + V$. In a case where an ON time Ton which is an elapsed time for an ON state of the drive unit and an OFF time Toff which is an elapsed time from an OFF state thereof are sufficiently short, this leads to $i \cong (Imax+Imin)/2$. When the drive unit is in an ON state, a power source voltage is indicated by E, and thus Vc is E, so that $E = R*i + L*di/dt + V$ (1) is obtained.

In a case where the ON time Ton is sufficiently short, $di/dt = (Imax-Imin)/Ton$ (2) is obtained. When the drive unit is in an OFF state, Vc is 0, and thus $0 = R*i + L*di/dt + V$ (3) is given.

In a case where the OFF time Toff is sufficiently short, $di/dt = (Imin-Imax)/Toff$ (4) is obtained.

A relationship of $V = E*Ton/(Ton+Toff) - R*i$ (5) is obtained on the basis of the above (1) to (4). Since the induced voltage is correlated with a rotation position of a rotor, in a case where Imax and Imin are fixed according to Equation (5), a rotation position of the rotor can be estimated on the basis of a relationship between Ton and Toff, and thus phase switching, that is, polarity switching of a drive signal can be performed at a desired timing.

Here, in a case where Ton and Imin are fixed, and Ton is sufficiently small, $Imax \cong Imin \cong i$ is obtained, and thus polarity switching of a drive signal can be performed at a desired timing by estimating a rotation position of the rotor on the basis of only Toff.

Here, in a case where Toff and Imax are fixed, and Toff is sufficiently small, $Imax \cong Imin \cong i$ is obtained, and thus polarity switching of a drive signal can be performed at a desired timing by estimating a rotation position of the rotor on the basis of only Ton.

First Embodiment

Hereinafter, with reference to the drawings, an electronic timepiece 1 according to a first embodiment of the present disclosure will be described.

Figure 1:
FIG. 1 is a front view illustrating an electronic timepiece of a first embodiment.

As illustrated in FIG. 1, the electronic timepiece 1 is a wristwatch mounted on a user's wrist, and includes an outer case 2, a disk-shaped dial 3, a movement (not illustrated), a stepping motor 13 (refer to FIG. 2; and hereinafter, referred to as a motor 13) provided in the movement, a second hand 5, a minute hand 6, an hour hand 7 which are driven pointers, and a crown 8 and a button 9 as operation members.

Circuit Configuration of Electronic Timepiece

Figure 2:
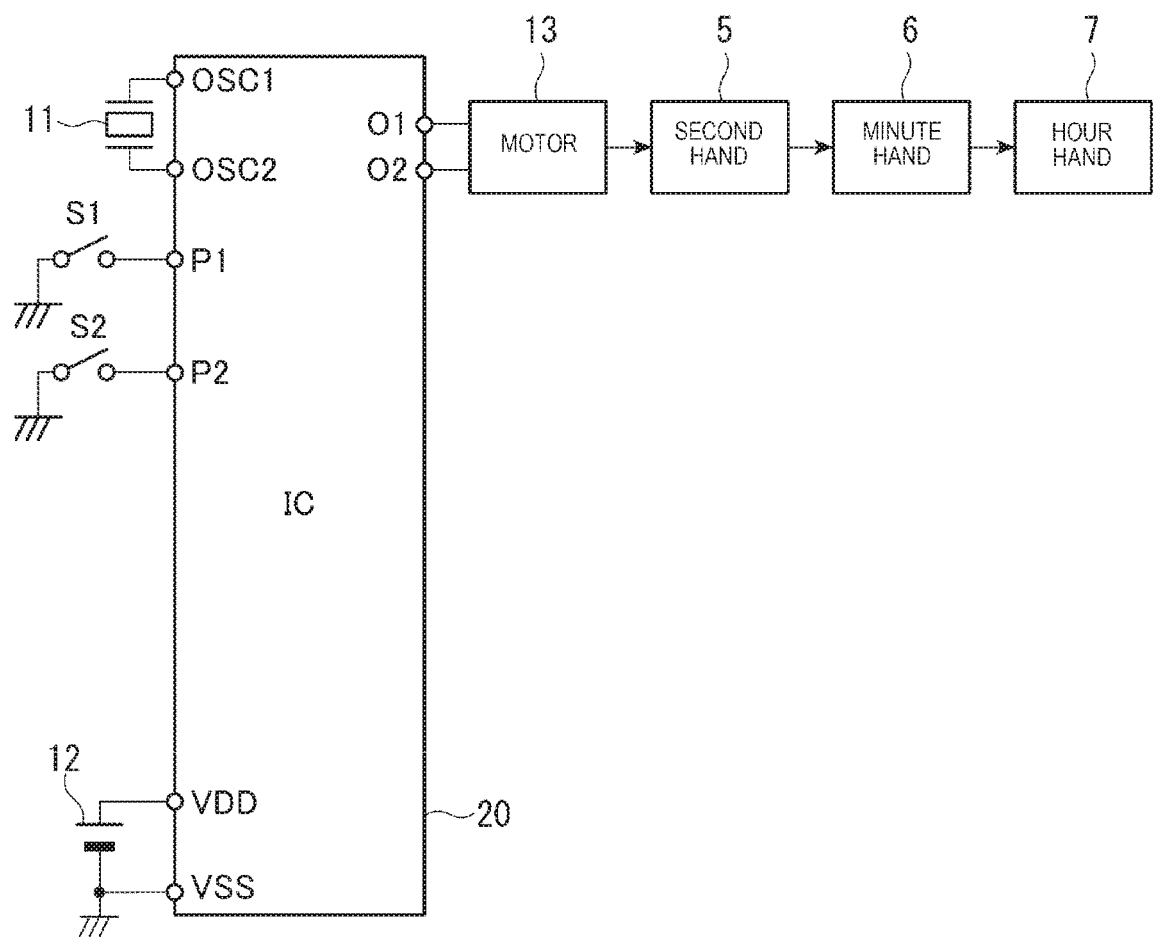
FIG. 2 is a circuit diagram illustrating a circuit configuration of the electronic timepiece according to the first embodiment.

As illustrated in FIG. 2, the electronic timepiece 1 includes a quartz crystal resonator 11 which is a signal source, a battery 12 which is a power source, a switch S1 which is turned on and off in conjunction with an operation on the button 9, a switch S2 which is turned on and off in conjunction with an extraction operation on the crown 8, and the motor 13, and an IC 20 for the timepiece.

Configuration of Motor

Figure 3:
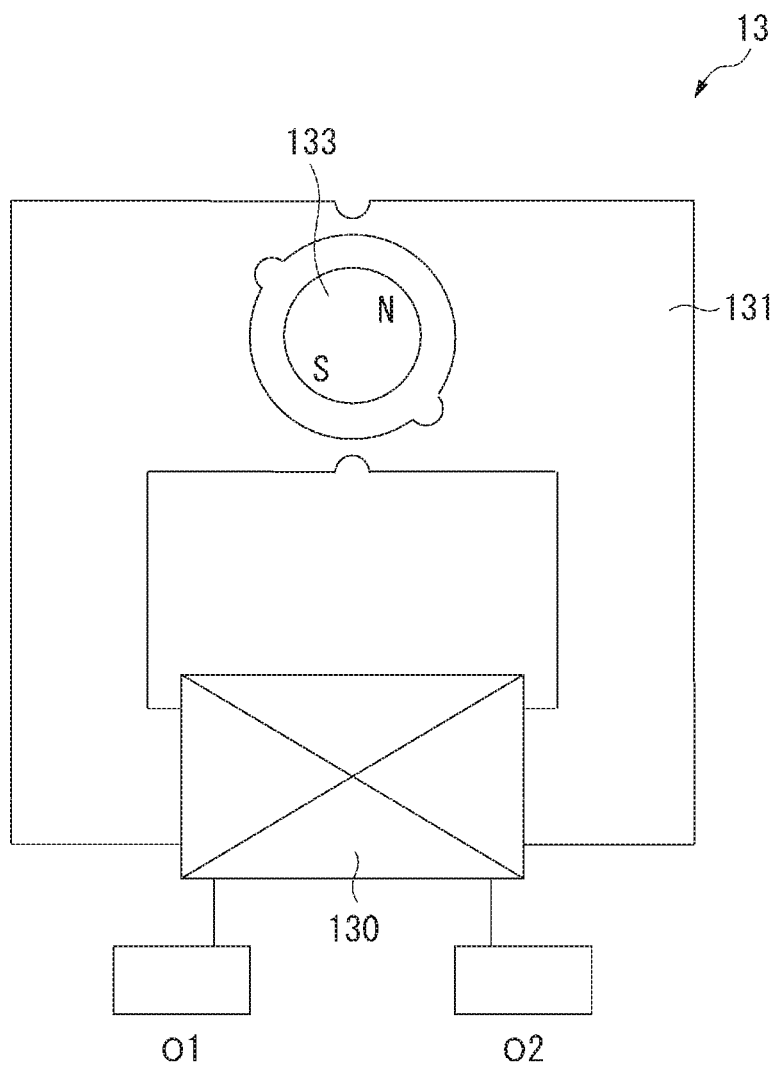
FIG. 3 is a diagram illustrating a configuration of a motor of the electronic timepiece according to the first embodiment.

As illustrated in FIG. 3, the motor 13 includes a stator 131, a coil 130, and a rotor 133. Both ends of the coil 130 are electrically connected to output terminals O1 and O2 of a driver 51 which will be described later, and the rotor 133 is a magnet which is magnetized to two poles in a diameter direction. Therefore, the motor 13 is a bipolar single-phase stepping motor used for an electronic timepiece, and is driven by motor drive pulses (drive signals) output from the output terminals O1 and O2 of the IC 20 as will be described later.

The second hand 5, the minute hand 6, and the hour hand 7 are in conjunction with each other by a gear train (not illustrated), and are driven by the motor 13 so as to respectively display a second, a minute, and an hour. In the present embodiment, the second hand 5, the minute hand 6, and the hour hand 7 are driven by the single motor 13, but a plurality of motors may be provided, such as a motor driving the second hand 5, and a motor driving the minute hand 6 and the hour hand 7.

As illustrated in FIG. 2, the IC 20 has connection terminals OSC1 and OSC2 connected to the quartz crystal resonator 11, input/output terminals P1 and P2 connected to the switches S1 and S2, power source terminals VDD and VSS connected to the battery 12, and the output terminals O1 and O2 connected to the coil 130 of the motor 13.

In the present embodiment, a positive electrode of the battery 12 is connected to the high potential side power source terminal VDD, a negative electrode thereof is connected to the low potential side power source terminal VSS, and the low potential side power source terminal VSS is set to be grounded (for example, a reference potential).

The quartz crystal resonator 11 is driven by an oscillation circuit 21 which will be described later, and generates an oscillation signal.

The battery 12 is configured with a primary battery or a secondary battery. In a case of the secondary battery, the battery is charged by a solar cell (not illustrated).

The switch S1 is operated in conjunction with the button 9 located at the position of two o'clock of the electronic timepiece 1, and is brought into an ON state in a state in which the button 9 is pushed, and is brought into an OFF state in a state in which the button 9 is not pushed.

The switch S2 is a slide switch operated in conjunction with the crown 8. In the present embodiment, the switch S2 is brought into an ON state in a state in which the crown 8 is drawn out to the first stage, and is in an OFF state in the zero-th stage.

Circuit Configuration of IC

Figure 4:
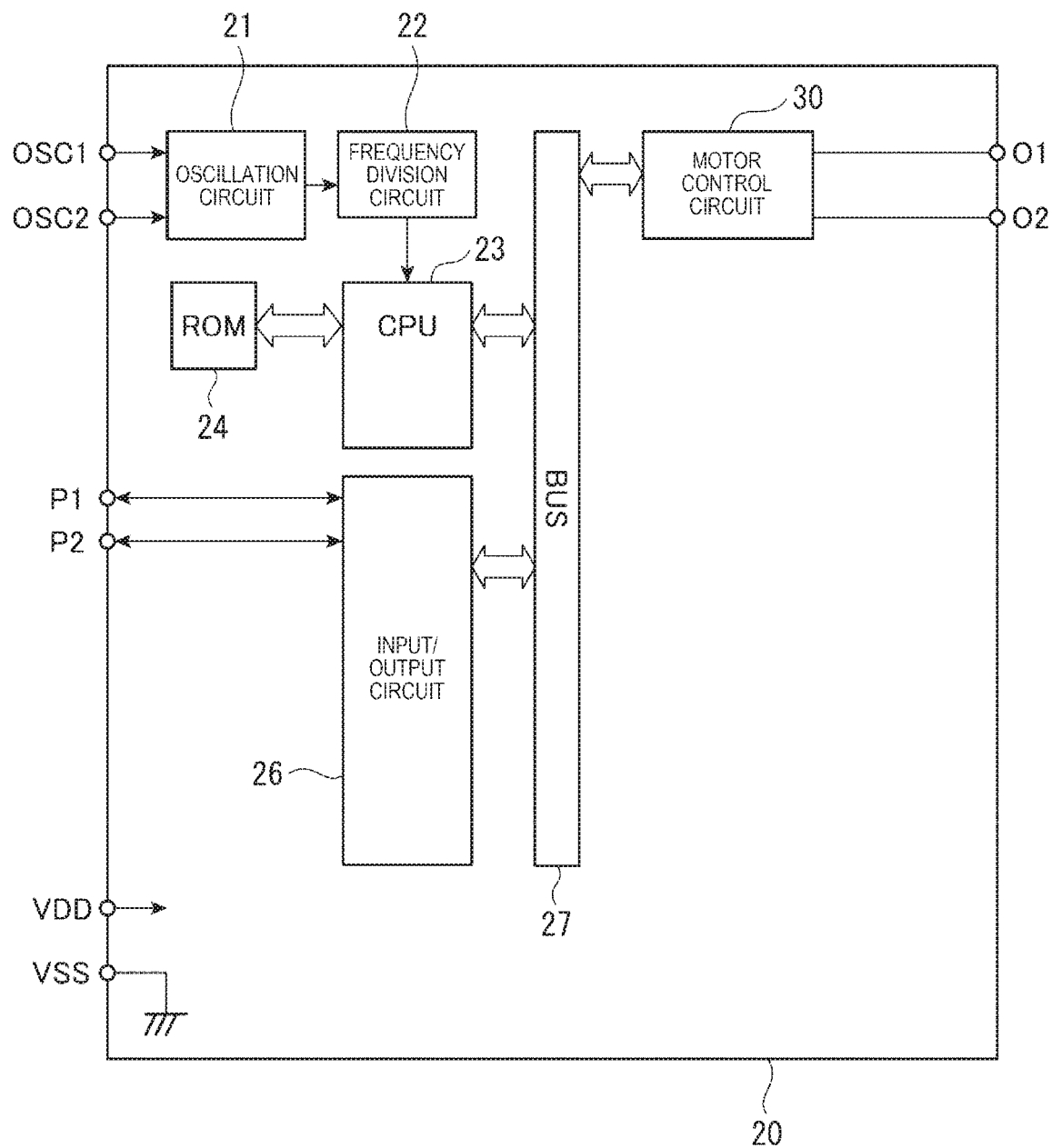
FIG. 4 is a configuration diagram illustrating a configuration of an IC of the electronic timepiece according to the first embodiment.

As illustrated in FIG. 4, the IC 20 includes the oscillation circuit 21, a frequency division circuit 22, a central processing unit (CPU, processor) 23 for control of the electronic timepiece 1, a read only memory (ROM) 24, an input/output circuit 26, a bus 27, and a motor control circuit 30.

The oscillation circuit 21 causes the quartz crystal resonator 11 which is a reference signal source to oscillate at a high frequency, and outputs an oscillation signal having a predetermined frequency (for example, 32768 Hz) generated through high frequency oscillation, to the frequency division circuit 22.

The frequency division circuit 22 frequency-divides the output from the oscillation circuit 21, so as to supply a timing signal (clock signal) to the CPU 23.

The ROM 24 stores various programs executed by the CPU 23. In the present embodiment, the ROM 24 stores programs for realizing a fundamental timepiece function.

The CPU 23 executes the programs stored in the ROM 24 so as to realize the respective functions.

The input/output circuit 26 outputs states of the input/output terminals P1 and P2 to the bus 27. The bus 27 is used to transmit data among the CPU 23, the input/output circuit 26, and the motor control circuit 30.

The motor control circuit 30 outputs a predetermined drive signal (that is, a drive pulse) in response to a communication which is input from the CPU 23 via the bus 27.

Configuration of Motor Control Circuit

Figure 5:
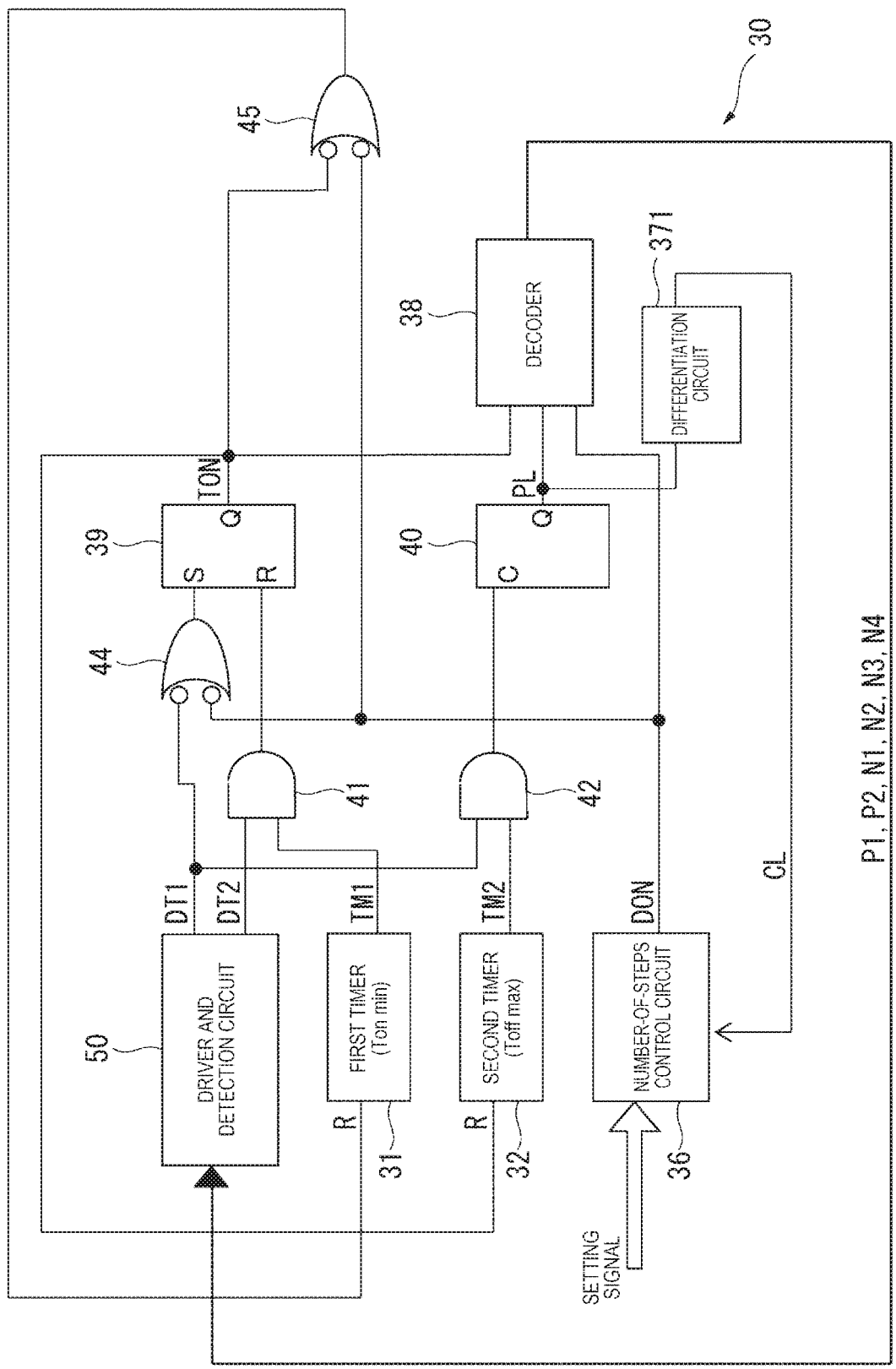
FIG. 5 is a circuit diagram illustrating a configuration of a motor control circuit according to the first embodiment.

As illustrated in FIG. 5, the motor control circuit 30 includes a first timer 31, a second timer 32, a number-of-steps control circuit 36, a differentiation circuit 371, a decoder 38, an SR latch circuit 39, a flip-flop 40, AND circuits 41 and 42, OR circuits 44 and 45, and a driver and detection circuit 50.

The first timer 31 is a timer measuring a minimum time t1 of a time (an ON time of the driver 51 which will be described later) for which a current is supplied to the coil 130 of the motor 13. An output TM1 from the first timer 31 is turned to an H level after the time t1 from the time at which a reset terminal R of the first timer 31 is turned to an L level such that a reset state thereof is canceled.

The second timer 32 is a timer measuring a determination time t2 related to a condition for switching a polarity of a current flowing through the coil 130 of the motor 13. In other words, the determination time t2 is a first setting time. An output TM2 from the second timer 32 is turned to an H level after the time t2 from the time at which a reset terminal R of the second timer 32 is turned to an L level such that a reset state thereof is canceled.

The driver and detection circuit 50 is a circuit which supplies a current to the coil 130 of the motor 13 and determines whether or not a value of the current flowing through the coil 130 exceeds a predetermined value. Details of the driver and detection circuit 50 will be described later with reference to FIG. 6.

The number-of-steps control circuit 36 includes a presettable down-counter, and outputs a drive period signal DON. The number-of-steps control circuit 36 sets the drive period signal DON in an H level until a preset value of the presettable down-counter set by a setting signal is counted down and becomes 0 by using a clock signal CL, and turns the drive period signal DON to an L level when the presettable down-counter becomes 0.

The setting signal which is input to the number-of-steps control circuit 36 is input from, for example, the CPU 23 via the bus 27.

The decoder 38 receives a signal TON for switching ON and OFF of an drive signal output which will be described later, a drive polarity signal PL for switching a polarity of a drive signal, and the drive period signal DON for controlling starting and stopping of the driver 51, and outputs gate signals P1, P2, N1, N2, N3, and N4 to the driver and detection circuit 50 depending on states of the signals as illustrated in a timing chart in FIG. 8 which will be described later. Therefore, a drive control unit controlling driving of the driver 51 which is a drive unit is configured to include the decoder 38.

The differentiation circuit 371 outputs a differentiation pulse whenever the drive polarity signal PL rises and falls.

The AND circuit 41 receives an output DT2 from the driver and detection circuit 50 and the output TM1 from the first timer 31.

The AND circuit 42 receives the output DT1 from the driver and detection circuit 50 and the output TM2 from the second timer 32.

The OR circuit 44 receives a signal obtained by inverting the output DT1 from the driver and detection circuit 50, and a signal obtained by inverting the output DON from the number-of-steps control circuit 36.

The SR latch circuit 39 has a set terminal S to which an output from the OR circuit 44 is input, and a reset terminal R to which an output from the AND circuit 41 is input. The SR latch circuit 39 outputs an ON/OFF switching signal TON from an output terminal Q. The output TON from the SR latch circuit 39 is input to the decoder 38, the OR circuit 45, and the reset terminal R of the second timer 32.

The flip-flop 40 has a clock terminal C to which an output from the AND circuit 42 is input. The flip-flop 40 outputs the drive polarity signal PL from an output terminal Q.

The OR circuit 45 receives an inverted signal of the output DON from the number-of-steps control circuit 36, and an inverted signal of the signal TON output from the SR latch circuit 39. An output from the OR circuit 45 is input to the reset terminal R of the first timer 31.

Configurations of Driver and Detection Circuit

Figure 6:
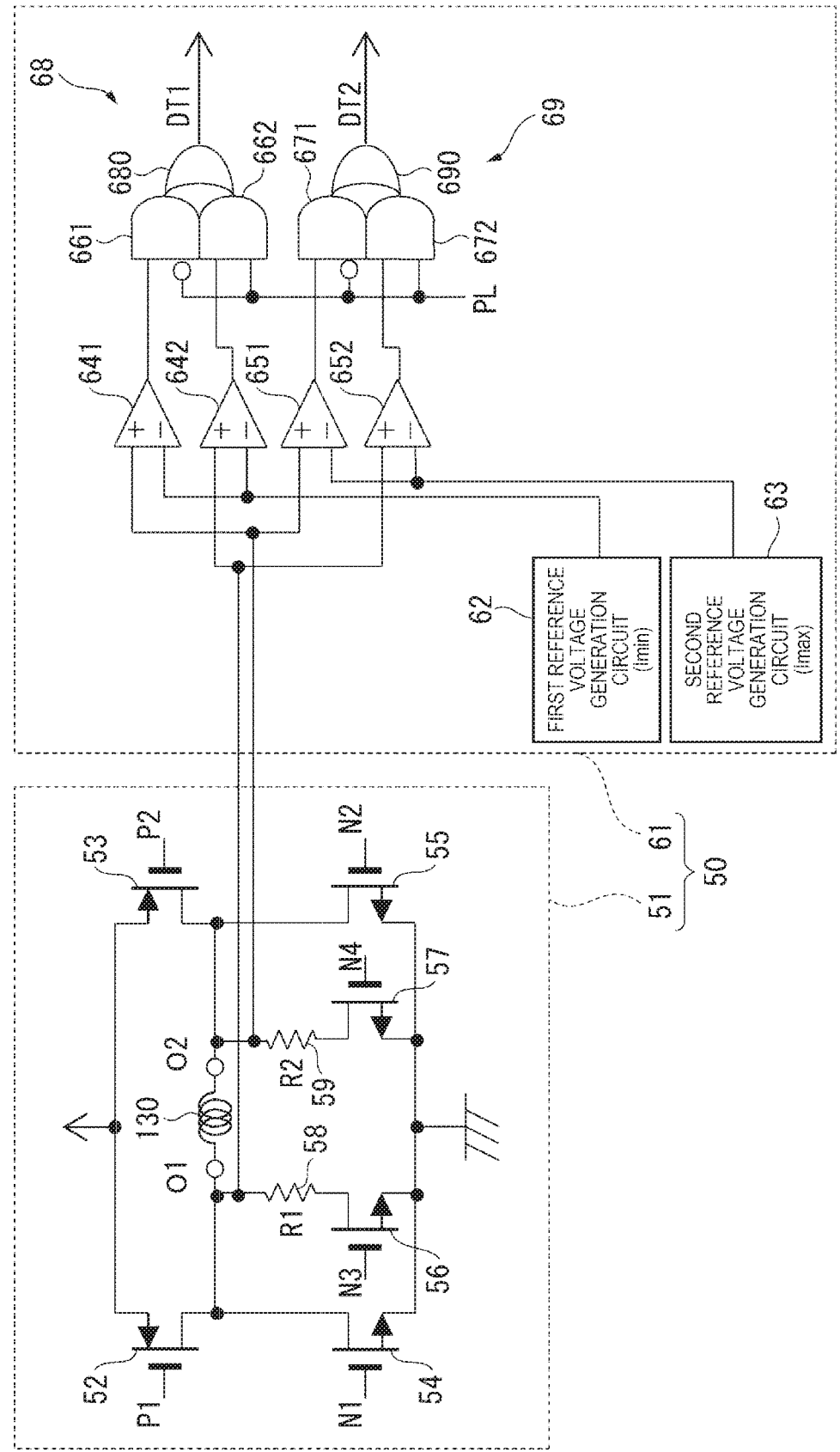
FIG. 6 is a circuit diagram illustrating configurations of a driver and a detection circuit according to the first embodiment.

The driver and detection circuit 50 includes the driver 51 and a current detection circuit 61 as illustrated in FIG. 6.

The driver 51 includes two Pch transistors 52 and 53, four Nch transistors 54, 55, 56, and 57, and two detection resistors 58 and 59. The respective transistors 52 to 57 are controlled according to the gate signals P1, P2, N1, N2, N3, and N4 output from the decoder 38, and supplies currents to the coil 130 of the motor 13 in both of a forward direction and a backward direction. Therefore, the driver 51 is a drive unit which outputs a drive signal to the coil 130 of the motor 13 and drives the motor 13.

The current detection circuit 61 includes a first reference voltage generation circuit 62, a second reference voltage generation circuit 63, comparators 641, 642, 651, and 652, and complex gates 68 and 69. The complex gate 68 is a single element having a function equivalent to a combination of AND circuits 661 and 662 and an OR circuit 680 illustrated in FIG. 6. The complex gate 69 is a single element having a function equivalent to a combination of AND circuits 671 and 672 and an OR circuit 690.

The comparators 641 and 642 respectively compare voltages generated in both ends of the detection resistors 58 and 59 having resistance values R1 and R2 with a voltage from the first reference voltage generation circuit 62.

Since the drive polarity signal PL is inverted to be input to the AND circuit 661, and the drive polarity signal PL is input to the AND circuit 662 without being inverted, an output from one of the comparators 641 and 642 selected according to the drive polarity signal PL is output as the output DT1.

The comparators 651 and 652 respectively compare voltages generated in both ends of the detection resistors 58 and 59 having resistance values R1 and R2 with a voltage from the second reference voltage generation circuit 63.

Since the drive polarity signal PL is inverted to be input to the AND circuit 671, and the drive polarity signal PL is input to the AND circuit 672 without being inverted, an output from one of the comparators 651 and 652 selected according to the drive polarity signal PL is output as the output DT2.

The first reference voltage generation circuit 62 is set to output a potential corresponding to voltages generated in both ends of the detection resistors 58 and 59 in a case where a current flowing through the coil 130 is the lower limit current value Imin.

Therefore, in a case where a current I flowing through the coil 130 is equal to or more than the lower limit current value Imin, voltages generated in both ends of the detection resistors 58 and 59 exceed an output voltage from the first reference voltage generation circuit 62, and thus the detection signal DT1 is turned to an H level. On the other hand, in a case where the current I is less than the lower limit current value Imin, the detection signal DT1 is turned to an L level. Therefore, the first reference voltage generation circuit 62, the comparators 641 and 642, and the complex gate 68 of the current detection circuit 61 configure a lower limit detection unit that detects that the current I flowing through the coil 130 is less than the lower limit current value Imin.

The second reference voltage generation circuit 63 generates a voltage corresponding to the upper limit current value Imax. Therefore, the output DT2 from the current detection circuit 61 is turned to an H level in a case where the current I flowing through the coil 130 exceeds the upper limit current value Imax, and is turned to an L level in a case where the current I is equal to or less than the upper limit current value Imax. Thus, the second reference voltage generation circuit 63, the comparators 651 and 652, and the complex gate 69 of the current detection circuit 61 configure an upper limit detection unit detecting that the current I flowing through the coil 130 exceeds the upper limit current value Imax.

Control Process of Motor Control Circuit

Figure 7:
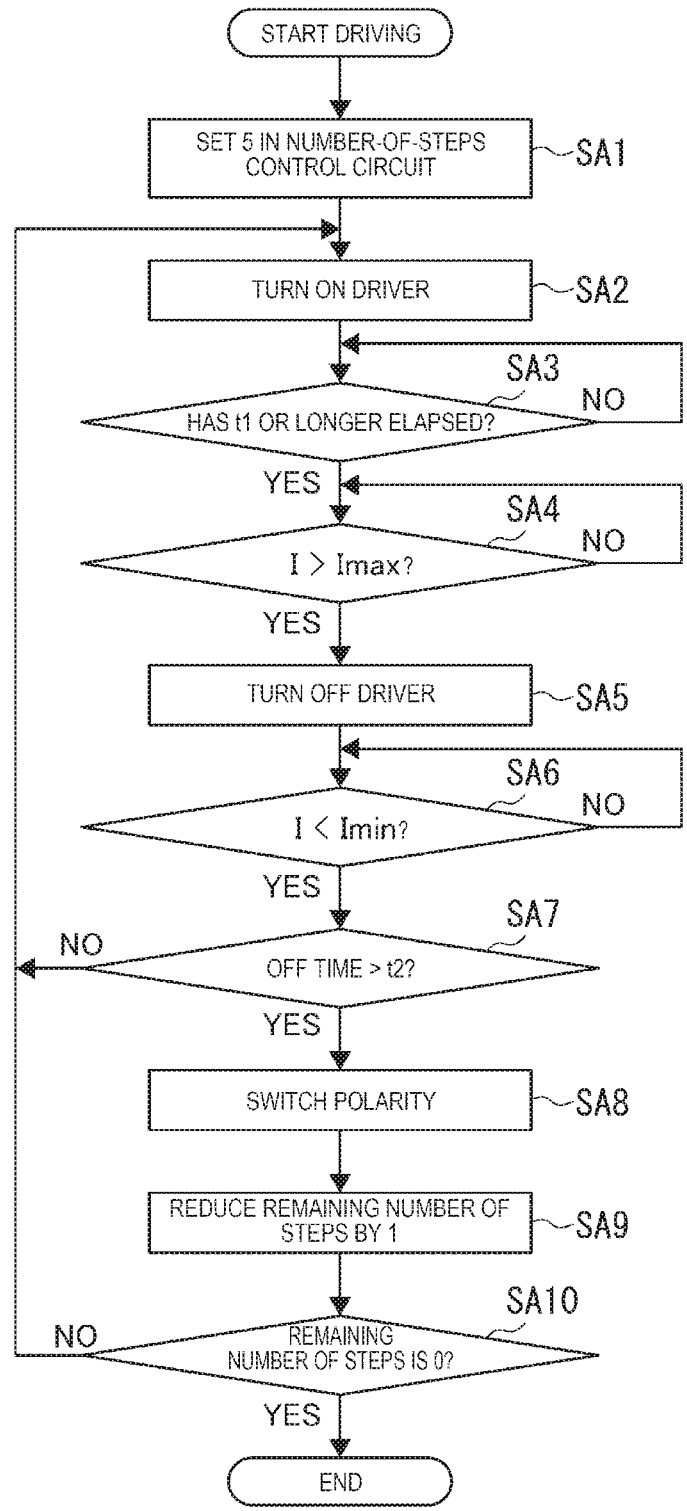
FIG. 7 is a flowchart illustrating a motor control process according to the first embodiment.

Next, control performed by the motor control circuit 30 of the present embodiment will be described with reference to a flowchart in FIG. 7, and a timing chart in FIG. 8.

Operation of Motor Control Circuit

In a case where drive control for the motor 13 is started, the CPU 23 of the IC 20 outputs a setting signal for setting a movement amount of a pointer to the number-of-steps control circuit 36 of the motor control circuit 30. For example, in a case where the number of steps for moving the second hand 5 by one second is "5", the CPU 23 outputs a signal for setting a setting value n of the number-of-steps control circuit 36 to "5" every second (SA1).

After the CPU 23 outputs the setting signal, and the setting value n of the number-of-steps control circuit 36 is set, the following control is performed by each circuit of the motor control circuit 30. In other words, the CPU 23 may only output a setting signal for setting a drive amount of the motor 13 to the motor control circuit 30 at a timing at which the motor 13 is driven.

In a case where the setting value n=5 is set in the number-of-steps control circuit 36 according to the setting signal, the output DON from the number-of-steps control circuit 36 is turned to an H level, the decoder 38 turns on the driver 51 of the motor 13 by using the gate signals P1, P2, N1, N2, N3, and N4 (SA2), and thus a forward current flows through the coil 130. In the flowchart and the following description, turning on the driver 51 indicates that the driver 51 is controlled to be brought into an ON state in which a drive current can be made to flow through the coil 130, and turning off the driver 51 indicates that the driver 51 is controlled to be brought into an OFF state in which a drive current cannot be made to flow through the coil 130.

Figure 8:
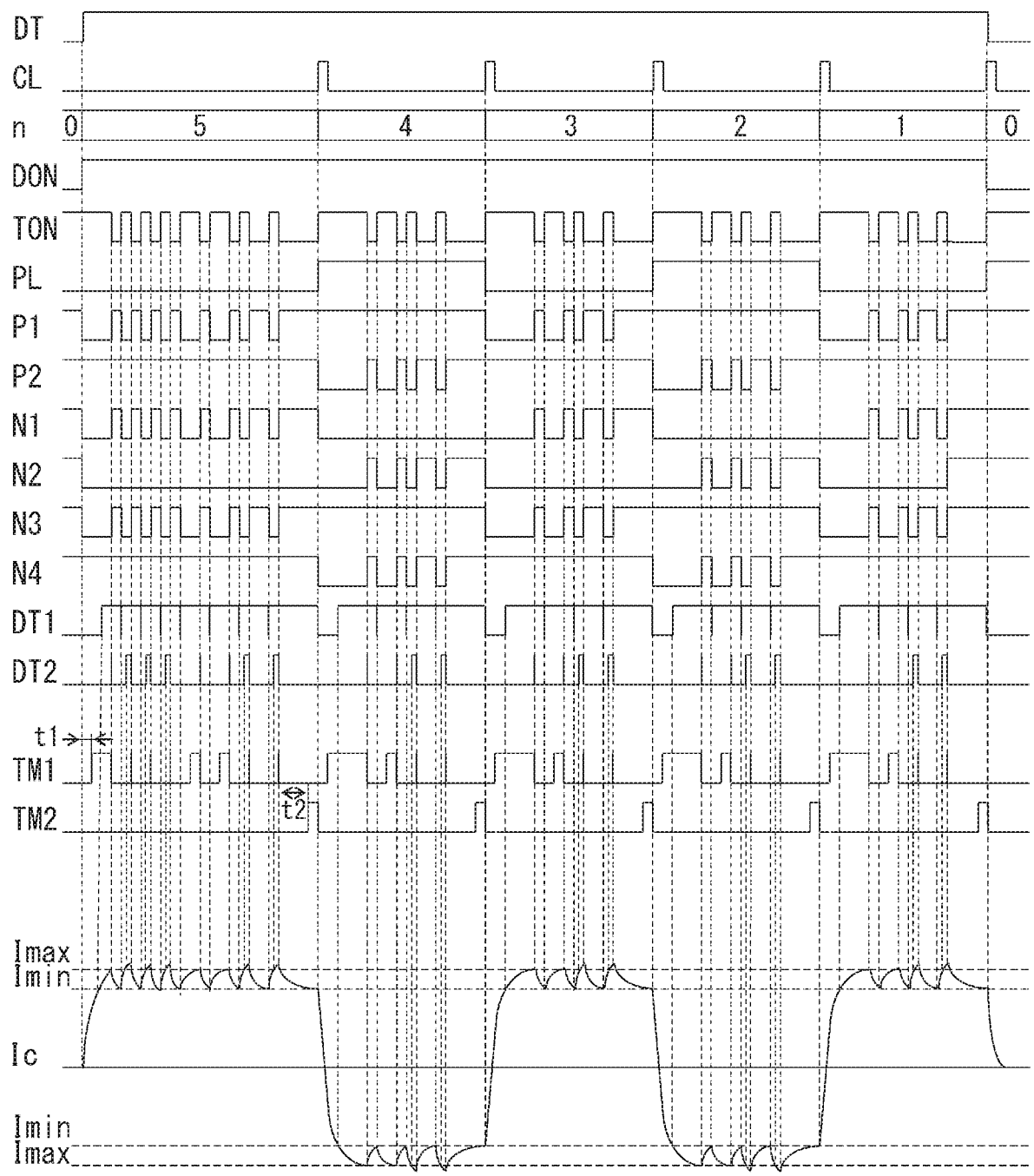
FIG. 8 is a timing chart illustrating an operation in the motor control process according to the first embodiment.

In the present embodiment, in the timing chart in FIG. 8, right after the output DON is turned to an H level, P1 has an L level, and P2 has an H level. Thus, the Pch transistor 52 is turned on, and the Pch transistor 53 is turned off. Since the N1 to N3 have an L level, and N4 has an H level, the Nch transistors 54, 55, and 56 are turned off, and the Nch transistor 57 is turned on. Thus, a current flows through the Pch transistor 52, the terminal O1, the coil 130, the terminal O2, the detection resistor 59, and the Nch transistor 57. In the present embodiment, the current flowing through the coil 130 from the terminal O1 toward the terminal O2 is defined as a forward current. In the present embodiment, a drive signal (drive current) output to the coil 130 switches between a first polarity and a second polarity, and a forward current flows through the coil 130 in a case of the first polarity. Therefore, a state in which a forward current flows through the coil 130 is a state in which the driver 51 is controlled to be brought into an ON state such that a drive signal having the first polarity is output.

Next, the first timer 31 is operated according to a level of the output TM1 from the first timer 31, and then determines whether or not a predetermined time t1 has elapsed (SA3). The first timer 31 starts to be operated at the time at which the driver 51 is turned on, and thus determines whether or not the predetermined time t1 has elapsed after the driver 51 is turned on in SA3. In a case where a determination result in SA3 is NO, the process in SA3 is repeatedly performed.

In a case where a determination result in SA3 is YES, the current detection circuit 61 determines whether or not the current I flowing through the coil 130 exceeds the upper limit current value Imax (SA4). The current detection circuit 61 continuously performs the determination process in SA4 until voltages generated in the detection resistors 58 and 59 exceed a reference voltage from the first reference voltage generation circuit 62 (NO in SA4).

On the other hand, in a case where a determination result in SA4 is YES, this corresponds to, in SA2, a case where an elapsed time from turning-on of the driver 51 is equal to or longer than the time t1, and the current I exceeds the upper limit current value Imax.

In other words, in a case where the output TON from the SR latch circuit 39 is turned to an H level, an output from the OR circuit 45 is turned to an L level from an H level, and thus a reset state of the first timer 31 is canceled.

Thus, the first timer 31 starts to measure elapse of the time t1, continuously outputs a signal having an L level until the time t1 elapses, and outputs a signal having an H level in a case where the time t1 has elapsed, that is, a determination result in SA3 is YES. An output from the AND circuit 41 is turned to an H level at the time at which both of the output TM1 and the output DT2 from the current detection circuit 61 are turned to an H level.

In a case where the output from the AND circuit 41 is turned to an H level, the SR latch circuit 39 is reset, and the output TON is turned to an L level. Therefore, the decoder 38 turns off the driver 51 by using the gate signals P1, P2, N1, N2, N3, and N4 (SA5). Specifically, P1 is turned to an H level, P2 is turned to an H level, N1 is turned to an H level, N2 is turned to an L level, N3 is turned to an H level, and N4 is turned to an H level. Thus, both ends of the coil 130 are connected to the power source terminal VSS, so as to be short-circuited to each other, and thus the supply of the current I to the coil 130 from the driver 51 is also stopped. Therefore, a state in which a current does not flow through the coil 130 is a state in which the driver 51 is controlled to be brought into to an OFF state. In the present embodiment, a state in which the Pch transistors 52 and 53 and the Nch transistor 55 are turned off, and the Nch transistors 54, 56, and 57 are turned on is an OFF state of the driver 51 in the first polarity.

In this case, in a case where the signal TON is turned to an L level, the reset state of the second timer 32 is canceled, and thus the second timer 32 starts timer measurement. Therefore, in a case where the driver 51 is turned on, and thus the signal TON is turned to an H level, the second timer 32 is reset, and thus measurement of the time t2 is stopped.

Next, the current detection circuit 61 determines whether or not the current I flowing through the coil 130 is less than the lower limit current value Imin (SA6). In a case where a determination result in SA6 is YES, it is determined whether or not the OFF time of the driver 51 (an OFF time of a drive unit) exceeds the first setting time t2 (SA7). In other words, in a case where an elapsed time (OFF time) from turning-off of the driver 51 until the current I is less than Imin is equal to or shorter than the time t2, a determination result in SA7 is NO, and, in a case where the time exceeds the time t2, a determination result in SA7 is YES. Specifically, in a case where the current I is less than the lower limit current value Imin, and the output TM2 has an H level at a timing at which a determination result in SA6 is YES, it may be determined that the OFF time of the driver 51 exceeds the first setting time t2, and, in a case where the output TM2 has an L level, it may be determined that the OFF time does not exceed the time t2.

In a case where a determination result in SA7 is NO, polarity switching is not performed, and the flow returns to SA2, so that the driver 51 is turned on to drive the motor 13.

In other words, when the output TON is turned to an L level, the second timer 32 cancels a reset state thereof, and starts measurement of the time t2, and the output TM2 from the second timer 32 is turned to an H level at a time point at which the time t2 has elapsed.

In a case where the current I is less than the lower limit current value Imin, the detection signal DT1 is turned to an L level. In this case, in a case where an OFF time measured by the second timer 32 is shorter than the time t2, since the output TM2 from the second timer 32 is maintained in an L level, an output from the AND circuit 42 is maintained in an L level even if a level of the detection signal DT1 is changed, and thus the drive polarity signal PL output from the flip-flop 40 is maintained in an identical level. Therefore, polarity switching is not performed, the detection signal DT1 is turned to an L level, the output TON from the SR latch circuit 39 is turned to an H level, and thus the driver 51 is turned on.

In a case where the OFF time of the driver 51 exceeds the first setting time t2, and thus a determination result in SA7 is YES, the flip-flop 40 performs polarity switching by changing a signal level of the drive polarity signal PL (SA8).

The output TM2 from the second timer 32 has an L level until the OFF time of the driver 51 exceeds the first setting time t2, and is turned to an H level at the time at which the OFF time exceeds the first setting time t2. The detection signal DT1 has an H level at the time at which the driver 51 is turned off, and is turned to an L level at the time at which the current I is reduced to below the lower limit current value Imin. Therefore, as illustrated in FIG. 8, the output from the AND circuit 42 is maintained in an L level while the output TM2 has an L level, and is turned to an H level at the time at which the output TM2 is turned to an H level. In a case where the current I is less than the lower limit current value Imin, and thus the detection signal DT1 is turned to an L level, the output from the AND circuit 42 is turned to an L level from an H level. In a case where a clock signal falling from an H level to an L level is input to the flip-flop 40 from the AND circuit 42, a state of the drive polarity signal PL is inverted, and the decoder 38 controls the driver 51 to switch a polarity of a drive signal. Since an OFF time of the driver 51 is correlated with a rotation angle of the rotor 133, the time t2 may be set on the basis of a value generated when the rotor 133 is rotated by about 180°.

Therefore, in the present embodiment, a polarity switching unit is configured with the second timer 32 measuring the first setting time t2 serving as a polarity switching condition, the current detection circuit 61 detecting that the current I is less than the lower limit current value Imin, the AND circuit 42 outputting a clock signal on the basis of a detection result, and the flip-flop 40 and the decoder 38 controlling the driver 51 to switch a polarity of a drive signal according to an output signal from the AND circuit 42.

In a case where a state of the drive polarity signal PL is inverted, and polarity switching is performed, a signal is output from the differentiation circuit 371 to which the drive polarity signal PL is input, the signal is input to the number-of-steps control circuit 36 as a clock signal CL, and thus the remaining number of steps is reduced by one (SA9).

The number-of-steps control circuit 36 checks whether or not the remaining number of steps is 0 (SA10), and maintains the drive period signal DON in an H level in a case where a determination result in SA10 is NO (n is not 0). Thus, the flow returns to SA2, and the driver 51 is turned on by using a signal from the decoder 38. However, since the drive polarity signal PL is inverted, the decoder 38 outputs gate signals for setting a direction of a current flowing through the coil 130 to be opposite to a direction in the positive time. Specifically, P1 is turned to an H level, P2 is turned to an L level, N1, N2, and N4 are turned to an L level, and N3 is turned to an H level. Consequently, the Pch transistor 52 is turned off, and the Pch transistor 53 is turned on. The Nch transistors 54, 55, and 57 are turned off, and the Nch transistor 56 is turned on. Thus, a current flows through the Pch transistor 53, the terminal O2, the coil 130, the terminal O1, the detection resistor 58, and the Nch transistor 56. Therefore, a drive signal (that is, a drive current) output to the coil 130 has the second polarity, and a current in the backward direction opposite to the forward direction flows through the coil 130. Therefore, a state in which the backward current flows through the coil 130 is a state in which the driver 51 is controlled to be turned on to output a drive signal having the second polarity.

As illustrated in FIG. 8, the gate signals P1, P2, N1, N2, N3, and N4 are set such that directions of a current flowing through the coil 130 are different from each other, that is, polarities are different from each other, in a case of n=5, 3, and 1 and in a case of n=4 and 2.

In the present embodiment, in an OFF state of the driver 51 in the second polarity, P1 has an H level, P2 has an H level, N1 has an L level, N2 has an H level, N3 has an H level, and N4 has an H level.

In other words, a state in which the Pch transistors 52 and 53 and the Nch transistor 54 are in an OFF state, and the Nch transistors 55, 56, and 57 are in an ON state is an OFF state of the driver 51 in the second polarity. Also in the OFF state in the second polarity, both ends of the coil 130 are connected to the power source terminal VSS so as to be short-circuited to each other, and thus the supply of the current I to the coil 130 from the driver 51 is stopped.

In a case where a determination result in SA10 is YES, the number-of-steps control circuit 36 turns the drive period signal DON to an L level, and thus the drive control for the motor 13 is finished.

Therefore, SA2 to SA10 are repeatedly performed, and thus the control as illustrated in FIG. 8 is performed. In other words, in a case where the current I is less than the lower limit current value Imin, the driver 51 is turned on, and, in a case where an elapsed time from turning-on of the driver 51 exceeds the time t1, and the current I exceeds the upper limit current value Imax, the driver 51 is turned off. In a case where the current I is less than the lower limit current value Imin in a state in which an OFF time of the driver 51 does not exceed the time t2, the driver 51 is turned on again. Therefore, turning-on and turning-off of the driver 51 are repeatedly performed in an identical polarity.

The polarity is switched at the time at which the current I is less than the lower limit current value Imin in a state in which the OFF time of the driver 51 exceeds the time t2, the remaining number of steps is reduced by one, and, in a case where the number of steps is not 0, the same drive control as described above is performed as illustrated in FIG. 8 except that a polarity differs. In a case where the number of steps becomes 0, the drive control for the motor 13 is finished.

The times t1 and t2 respectively measured by the timers 31 and 32 may be set according to characteristics or drive voltages of the motor 13, and, for example, the predetermined time t1 is set to 50 μsec, and the first setting time t2 is set to 150 μsec.

Effects of First Embodiment

According to the motor control circuit 30 of the present embodiment, in a case where the time t1 or longer has elapsed from turning-on of the driver 51, and the current I exceeds the upper limit current value Imax, the driver 51 is turned off. In a case where the rotor 133 is rotated by about 180° at which a polarity of a drive signal is switched, a rising time of the current I is shortened, but an ON state of the driver 51 is maintained for the minimum time t1 even in a case where the rising time of the current I is shortened. Therefore, the frequency of turning-on and turning-off of the driver 51 can be reduced, and thus current consumption can be reduced, compared with a case where driving is controlled through mere comparison between the current I, and the upper limit current value Imax and the lower limit current value Imin.

In a case where the rotor 133 is rotated by about 180° at which a polarity of a drive signal is switched, a rising time of the current I is shortened, and an ON time is substantially fixed to the minimum time t1. Therefore, a polarity switching timing can be determined on the basis of only a determination of whether or not an OFF time of the driver 51 exceeds the first setting time t2, and thus a configuration of the motor control circuit 30 can be simplified.

The motor control circuit 30 is configured with dedicated circuits using logic elements, and can thus realize low voltage driving and low power consumption so as to be appropriate for the portable electronic timepiece 1 such as, especially, a wristwatch.

First Modification Example

In the first embodiment, the predetermined time t1 is set in only an ON period of the driver 51, but a predetermined time may also be set in an OFF period. In other words, a determination process of determining whether or not a predetermined time has elapsed from turning-off of the driver 51 may be added between SA5 and SA6 in FIG. 7, and the processes in SA6 and thereafter may be performed in a case where the predetermined time has elapsed.

In this case, since an OFF period of the driver 51 is equal to or longer than the predetermined time, the frequency of turning-on and turning-off of the driver 51 can be further reduced, and thus current consumption can be further reduced.

Second Embodiment

Next, a second embodiment of the present disclosure will be described with reference to FIGS. 9 to 11. In the second embodiment, a constituent element equal or similar to that in the first embodiment is given the same reference numeral, and a description thereof will be omitted or made briefly.

Description of Configuration

Figure 9:
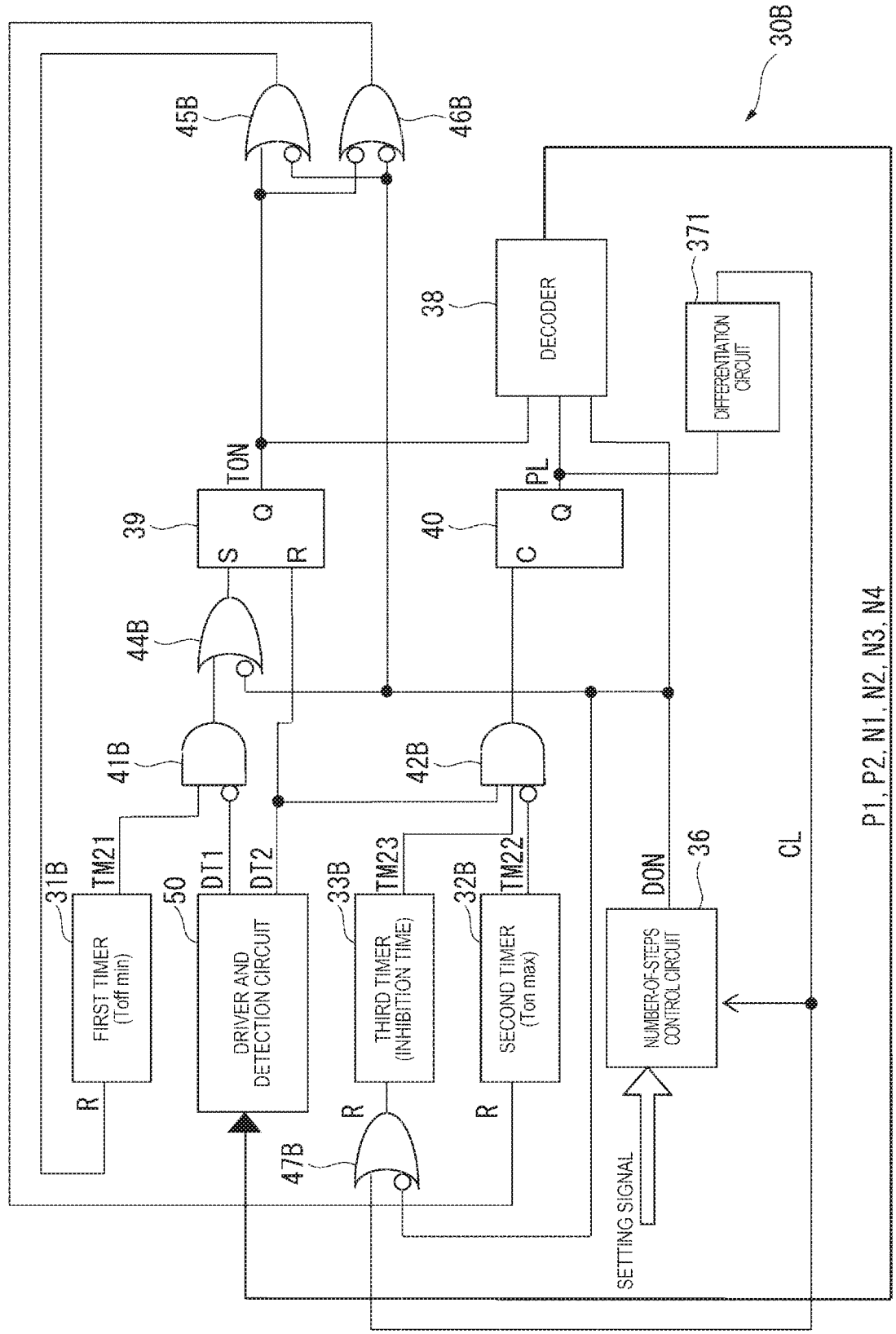
FIG. 9 is a circuit diagram illustrating a configuration of a motor control circuit according to a second embodiment.
Figure 10:
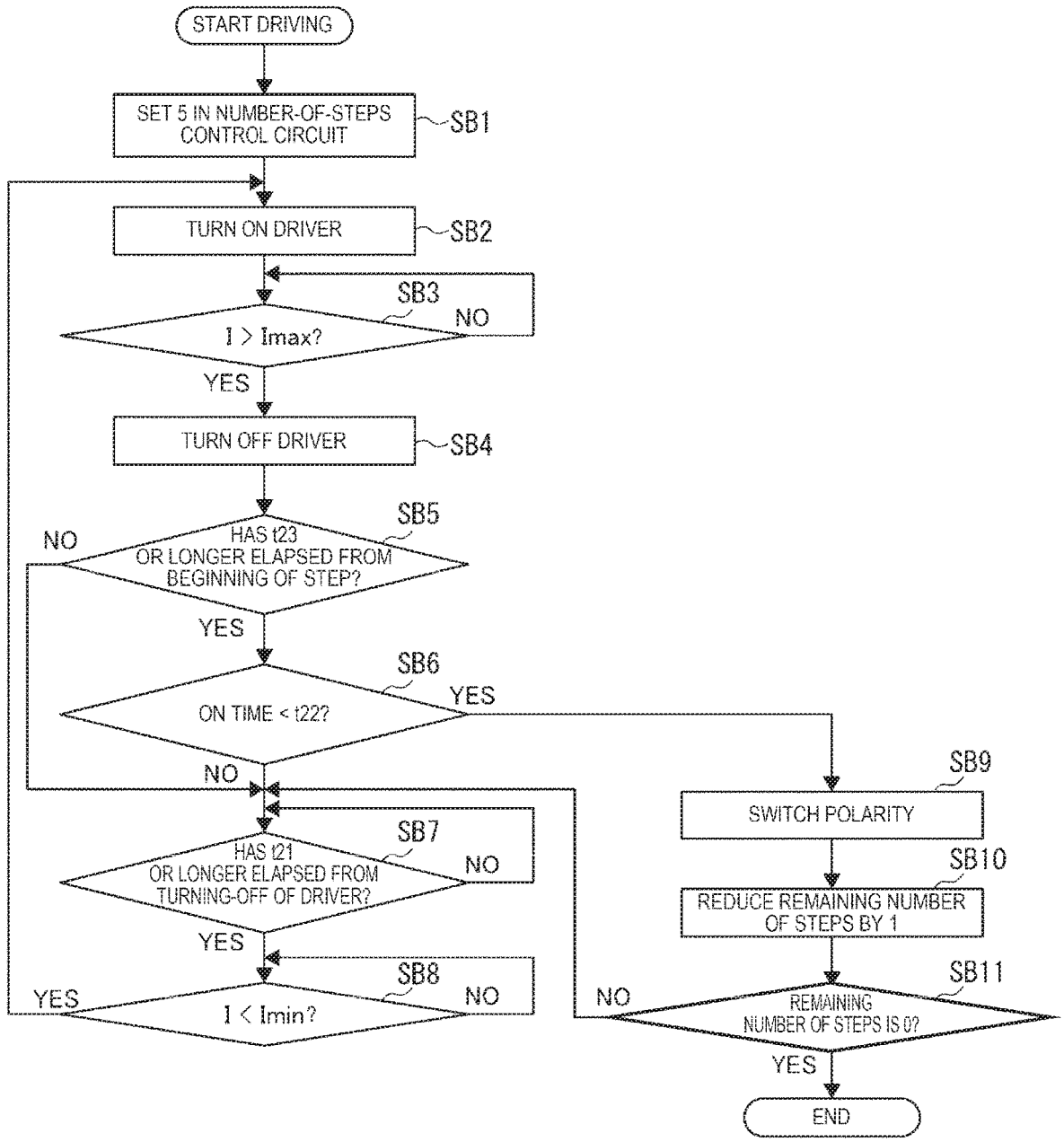
FIG. 10 is a flowchart illustrating a motor control process according to the second embodiment.

The second embodiment is different from the first embodiment in that a motor control circuit 30B illustrated in FIG. 9 is used. The motor control circuit 30B of the second embodiment also controls driving of the motor 13 of the electronic timepiece 1 in the same manner as in the first embodiment.

The motor control circuit 30B is different from the motor control circuit 30 in terms of configurations of a first timer 31B, a second timer 32B, AND circuits 41B and 42B, and OR circuits 44B and 45B. The motor control circuit 30B is different from the motor control circuit 30 in that a third timer 33B and OR circuits 46B and 47B are provided. The rest configuration is the same as that of the motor control circuit 30.

The first timer 31B is a timer measuring a minimum time (Toff min) t21 of a time for which the supply of a current to the coil 130 of the motor 13 is stopped after the driver 51 is turned off. An output TM21 from the first timer 31B is turned to an H level after the time t21 elapses from the time at which a signal which is input to a reset terminal R of the first timer 31B is turned to an L level such that a reset state thereof is canceled.

The second timer 32B is a timer measuring a time (ON time Ton) t22 for which a current is supplied to the coil 130 of the motor 13 after the driver 51 is turned on. The time t22 is a second setting time, and is related to a condition for switching a polarity of a current flowing through the coil 130 of the motor 13 as will be described later. An output TM22 from the second timer 32B is turned to an H level after the time t22 elapses from the time at which a signal which is input to a reset terminal R of the second timer 32B is turned to an H level such that a reset state thereof is canceled.

The third timer 33B is a timer measuring an inhibition time t23 for a determination for switching a polarity of a current flowing through the coil 130 is inhibited. An output TM23 from the third timer 33B is turned to an H level after the time t23 elapses from the time at which a signal which is input to a reset terminal R of the third timer 33B is turned to an L level such that a reset state thereof is canceled.

The configurations and operations of the driver and detection circuit 50, the number-of-steps control circuit 36, the decoder 38, and the differentiation circuit 371 of the motor control circuit 30B are the same as those in the motor control circuit 30.

The AND circuit 41B receives an inverted signal of the output DT1 from the driver and detection circuit 50, and the output TM21 from the first timer 31B. An output from the AND circuit 41B is input to the OR circuit 44B along with an inverted signal of the drive period signal DON. An output from the OR circuit 44B is input to the set terminal S of the SR latch circuit 39.

The AND circuit 42B receives the output DT2 from the driver and detection circuit 50, an inverted signal of the output TM22 from the second timer 32B, and the output TM23 from the third timer 33B. An output from the AND circuit 42B is input to the clock terminal of the flip-flop 40.

The OR circuit 45B receives the output TON from the SR latch circuit 39 and an inverted signal of the output DON, and an output signal from the OR circuit 45B is input to the reset terminal R of the first timer 31B.

The OR circuit 46B receives an inverted signal of the output TON and an inverted signal of the output DON, and an output signal from the OR circuit 46B is input to the reset terminal of the second timer 32B.

The OR circuit 47B receives the clock signal CL output from the differentiation circuit 371 and an inverted signal of the output DON, and an output from the OR circuit 47B is input to the reset terminal R of the third timer 33B.

Operation in Second Embodiment

Next, a description will be made of control performed by the motor control circuit 30B of the second embodiment with reference to a flowchart in FIG. 10 and a timing chart in FIG. 11.

Also in the second embodiment, in the same manner as in the first embodiment, in a case where a setting signal is input from the CPU 23, the motor control circuit 30B starts driving, and sets the number of steps (for example, five) in the number-of-steps control circuit 36 (SB1).

The number-of-steps control circuit 36 turns the drive period signal DON to an H level, and the decoder 38 controls the gate signals P1, P2, and N1 to N4 so as to turn on the driver 51, so that the current I is supplied to the coil 130 (SB2).

Next, the current detection circuit 61 determines whether or not the current I flowing through the coil 130 exceeds the upper limit current value Imax (SB3). As described above, the current detection circuit 61 continuously performs the determination process in SB3 until voltages generated in the detection resistors 58 and 59 exceed a reference voltage generated from the second reference voltage generation circuit 63 (NO in SB3).

On the other hand, in a case where a determination result in SB3 is YES, the current detection circuit 61 turns the detection signal DT2 to an H level, a reset signal is input to the SR latch circuit 39, and the signal TON is turned to an L level. In a case where the signal TON is turned to an L level, the decoder 38 controls the gate signals so as to turn off the driver 51 (SB4).

Next, whether or not the time t23 or longer has elapsed from the beginning of each step (SB5) is determined. The third timer 33B measuring the time t23 cancels a reset state thereof and starts time measurement at the time at which the output DON is turned to an H level (at the time of starting the step of n=5) and the time at which the clock signal CL is output from the differentiation circuit 371, that is, a polarity is switched.

Therefore, in a case where the output TM23 from the third timer 33B has an L level, an elapsed time from starting of each step is shorter than the time t23, and thus a determination result in SB5 is NO. On the other hand, in a case where the output TM23 from the third timer 33B has an H level, an elapsed time from starting of each step is equal to or longer than the time t23, and thus a determination result in SB5 is YES.

In a case where a determination result in SB5 is YES, an ON time of the driver 51 is shorter than the second setting time t22 (SB6). In a case where the signal TON is turned to an H level, the second timer 32B cancels a reset state thereof, and starts time measurement. The output TM22 has an L level in a case where a measured time is shorter than the time t22, and the output TM22 has an H level in a case where the measured time is equal to or longer than the time t22. Therefore, the current I exceeds the upper limit current value Imax, and thus a determination result in SB3 is YES, and, in a case where the output TM22 has an L level at the timing at which the driver 51 is turned off in SB4, an ON time of the driver 51 is shorter than the second setting time t22, and thus a determination result in SB6 is YES, and, in a case where the output TM22 has an H level, a determination result in SB6 is NO.

In a case where a determination result in SB5 is NO, or a determination result in SB6 is NO, it is determined whether or not the predetermined time t21 or longer has elapsed from the turning-off of the driver 51 (SB7). In a case where a determination result in SB7 is NO, the determination in SB7 continuously waits until the time t21 elapses, that is, the output TM21 from the first timer 31B is turned to an H level.

In a case where a determination result in SB7 is YES, the current detection circuit 61 determines whether or not the current I is less than the lower limit current value Imin (SB8).

In a case where a determination result in SB8 is YES, that is, the time t21 or longer has elapsed from turning-off of the driver 51, the output TM21 is turned to an H level, the current I is less than the lower limit current value Imin, and thus the output DT1 is turned to an L level, outputs from the AND circuit 41B and the OR circuit 44B are turned to an H level, and the output TON from the SR latch circuit 39 is turned to an H level. Therefore, the decoder 38 turns on the driver 51 (SB2). Hereinafter, the motor control circuit 30B repeatedly performs SB2 to SB8 until a determination result in SB6 is YES.

In a case where a determination result in SB6 is YES, the time t23 or longer has elapsed, the output TM23 has an H level, the current I exceeds the upper limit current value Imax, the detection signal DT2 has an H level, an ON time is shorter than the time t22, and the output TM22 has an L level. Thus, an output from the AND circuit 42B has an H level. Therefore, a clock signal is input to the flip-flop 40, the drive polarity signal PL is inverted, and thus a polarity is switched (SB9). Therefore, in the second embodiment, the second timer 32B, the third timer 33B, the current detection circuit 61, the AND circuit 42B, the flip-flop 40, and the decoder 38 configure a polarity switching unit which determines whether or not a polarity switching condition is satisfied, and switches a polarity of a drive signal.

Figure 11:
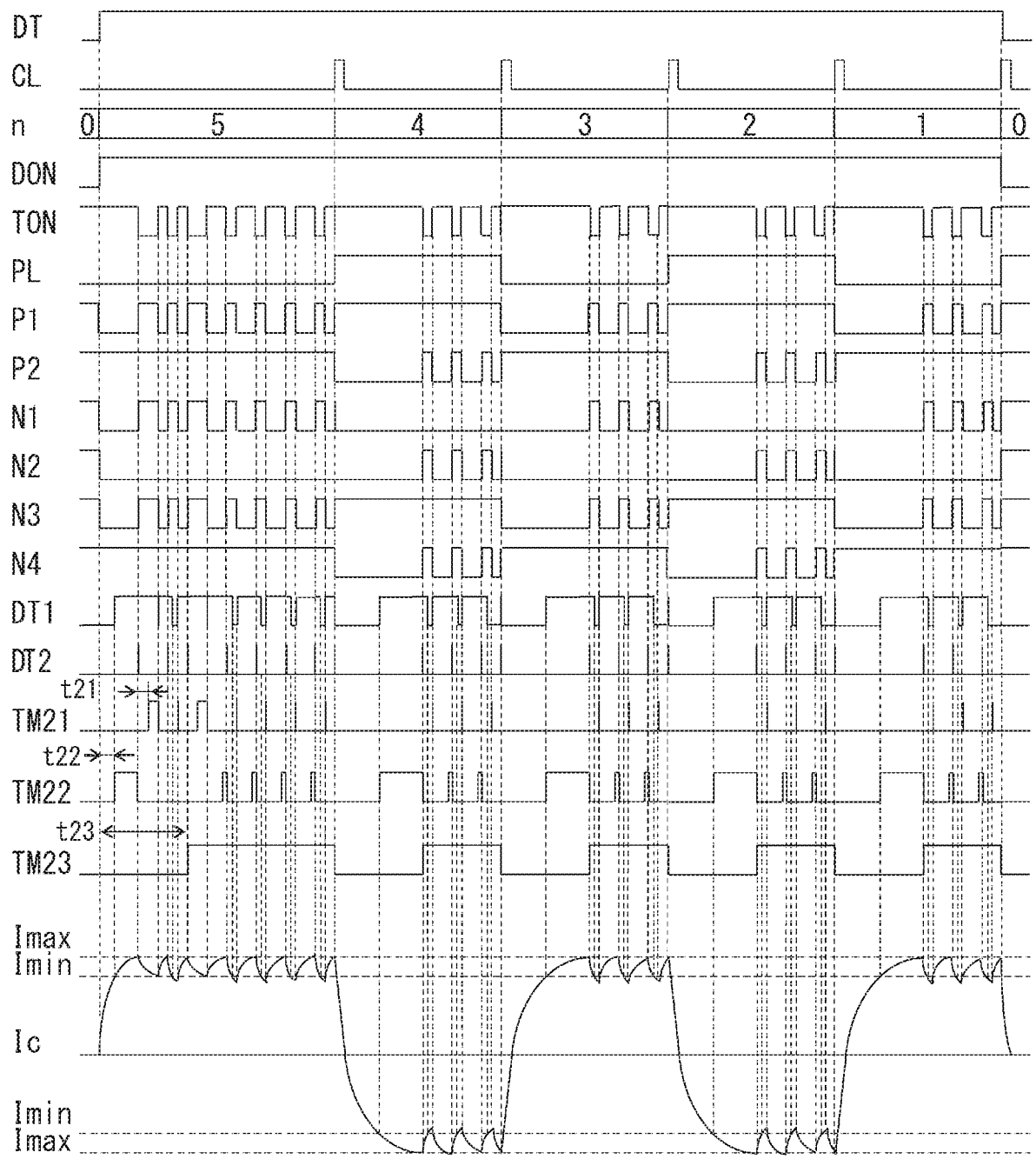
FIG. 11 is a timing chart illustrating an operation in the motor control process according to the second embodiment.

Since the drive polarity signal PL is inverted, the clock signal CL is output from the differentiation circuit 371, the number-of-steps control circuit 36 reduces the remaining number of steps by one (SB10), repeatedly performs SB2 to SB11 until the remaining number of steps becomes 0 (until a determination result in SB11 is YES), and thus the motor 13 can be normally driven as illustrated in FIG. 11.

As described above, since an ON time of the driver 51, that is, the motor 13 and a rotation angle of the rotor 133 are correlated with each other, the second setting time t22 is set to a value generated when the rotor 133 is rotated by a predetermined angle (for example, 180° in a bipolar rotor) corresponding to rotation in one step. Therefore, in a case where an ON time is shorter than the second setting time t22, it can be detected that the rotor 133 is rotated by a predetermined angle. However, as illustrated in FIG. 11, an ON time may be temporarily shorter than the time t22 even if the rotor 133 is not rotated by a predetermined angle right after each step is started. In order to prevent a wrong determination in this case, the motor control circuit 30B sets an inhibition time t23 for inhibiting a determination of polarity switching, and performs control such that an ON time is compared with the second setting time t22 after the inhibition time t23 elapses. Thus, as illustrated in FIG. 11, the motor 13 can be normally driven.

The times t21, t22, and t23 respectively measured by the timers 31B, 32B, and 33B may be set according to characteristics or drive voltages of the motor 13, and, for example, the time t21 is set to 50 μsec, the time t22 is set to 50 μsec, and the time t23 is set to 1 msec.

Effects of Second Embodiment

According to the second embodiment, in a case where the time t21 or longer has elapsed from turning-off of the driver 51, and the current I is less than the lower limit current value Imin, the driver 51 is turned on. Thus, even in a case where a falling time of the current I is shortened, an OFF time of the driver 51 is maintained for the minimum time t21. Therefore, the frequency of turning-on and turning-off of the driver 51 can be reduced, and thus current consumption can be reduced, compared with a case where driving is controlled through mere comparison between the current I, and the upper limit current value Imax and the lower limit current value Imin.

Since an ON time is not restricted, in a case where the rotor 133 is rotated by about 180° at which a polarity of a drive signal is switched, an OFF time is short, and thus the OFF time is substantially fixed to the minimum time t21. Therefore, a polarity switching timing can be determined on the basis of only a determination of whether or not an ON time of the driver 51 is shorter than the second setting time t22, and thus a configuration of the motor control circuit 30B can be simplified.

In the motor control circuit 30B, since the inhibition time t23 for which polarity switching is not performed is set from the time of starting each step, wrong polarity switching can be prevented from being performed even in a case where an ON time of the driver 51 is temporarily shortened right after each step is started.

The motor control circuit 30B is provided with the timers 31B to 33B in addition to the current detection circuit 61, and can perform control by only measuring an ON time or an OFF time of a drive unit. Thus, a configuration of the motor control circuit 30B can be simplified.

Second Modification Example

In the second embodiment, the inhibition time t23 is set in order to prevent a wrong determination of polarity switching execution, but polarity switching may be determined on the basis of the number of times of switching between turning-on and turning-off of the driver 51. In other words, in a case where the number of times of switching between turning-on and turning-off of the driver 51 is smaller than a threshold value (for example, five), polarity switching may be inhibited, and, in a case where the number of times of switching between turning-on and turning-off of the driver 51 is equal to or greater than the threshold value, polarity switching may be performed. In this case, a counter may be provided instead of the third timer 33B, and may count the number of changes of the output TON.

Third Embodiment

Figure 12:
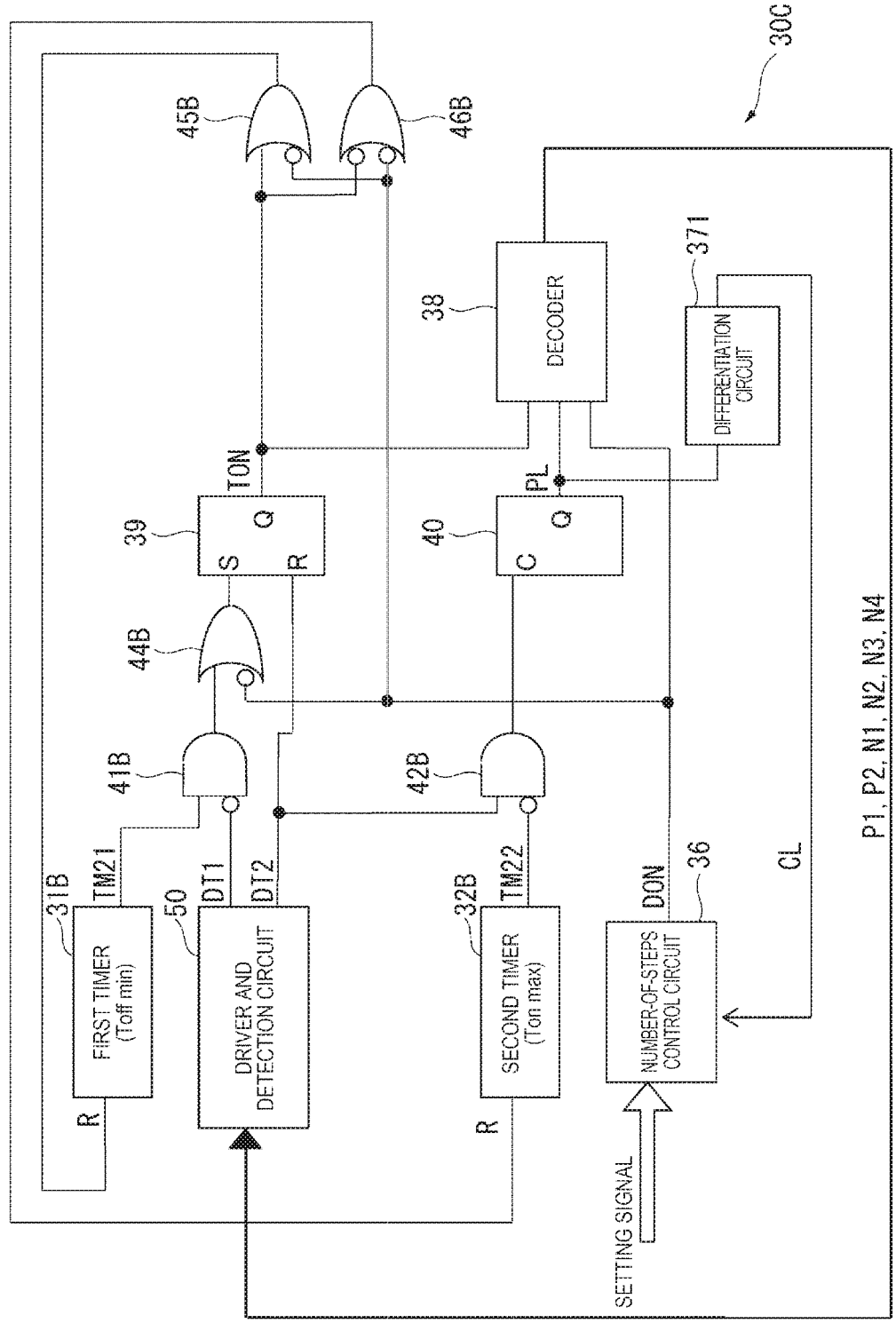
FIG. 12 is a circuit diagram illustrating a configuration of a motor control circuit according to a third embodiment.
Figure 13:
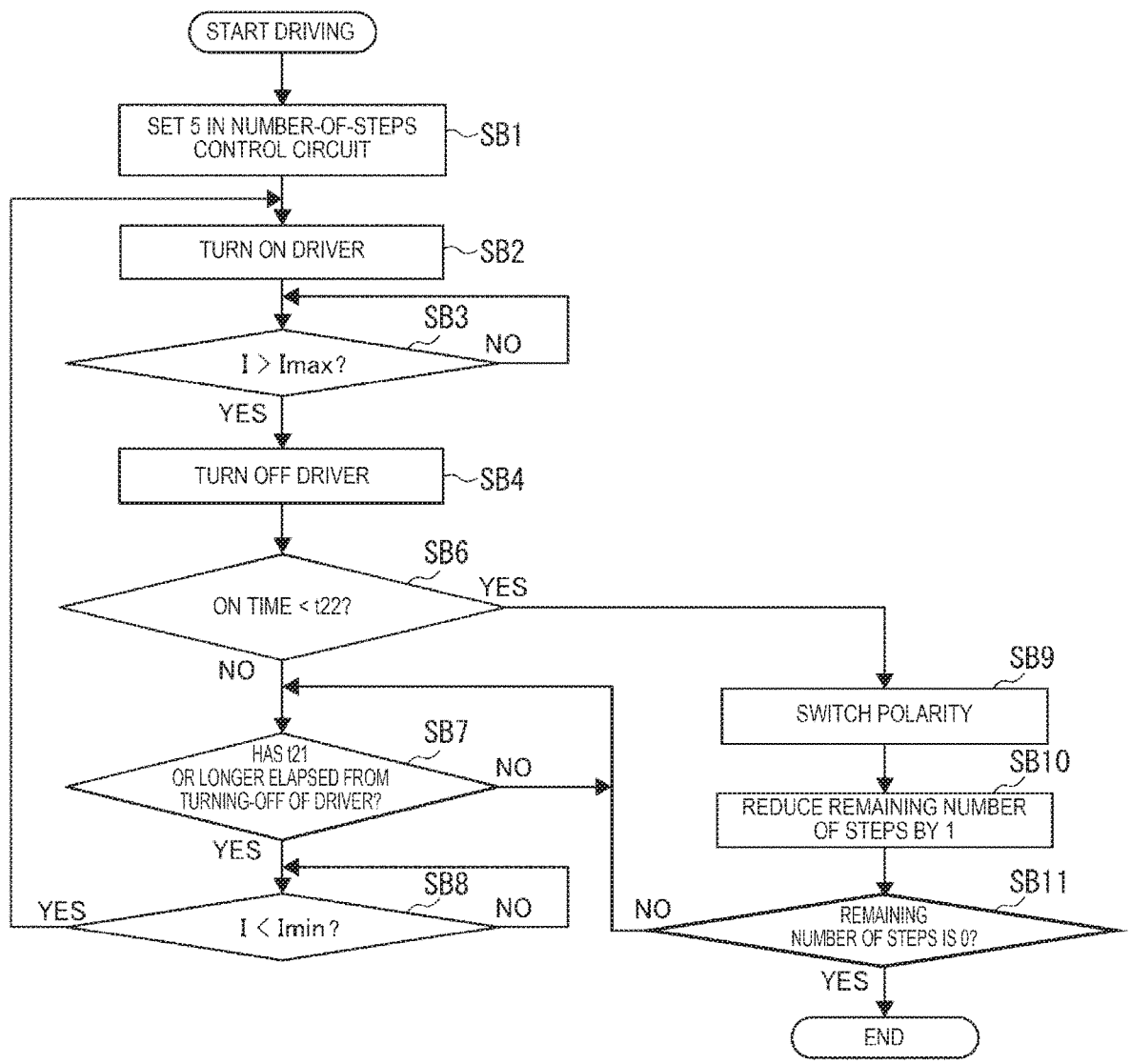
FIG. 13 is a flowchart illustrating a motor control process according to the third embodiment.

Next, a third embodiment of the present disclosure will be described with reference to FIGS. 12 to 14. In the third embodiment, the inhibition time t23 for polarity switching in the second embodiment is removed. Therefore, a constituent element and a process identical or similar to those in the second embodiment are given the same reference signs, and a description thereof will be omitted or made briefly.

A motor control circuit 30C is different from the motor control circuit 30B in that the third timer 33B, and the OR circuit 47B connected to the reset terminal of the third timer 33B are not provided. The rest configuration is the same as that of the motor control circuit 30B.

Operation in Third Embodiment

Next, a description will be made of control performed by the motor control circuit 30C of the third embodiment with reference to a flowchart in FIG. 13 and a timing chart in FIG. 14. As illustrated in the flowchart in FIG. 13, first, the motor control circuit 30C performs the same processes in SB1 to SB4 as the processes in SB1 to SB4 of the flowchart in FIG. 10 of the second embodiment.

In the motor control circuit 30B of the second embodiment, after SB4, in SB5, it is determined whether or not the inhibition time t23 for a polarity switching determination has elapsed by using the third timer 33B. On the other hand, the motor control circuit 30C of the third embodiment is not provided with the third timer 33B, and thus the process in SB5 is not performed. Thus, the motor control circuit 30C performs processes in SB6 to SB11 after SB4.

Figure 14:
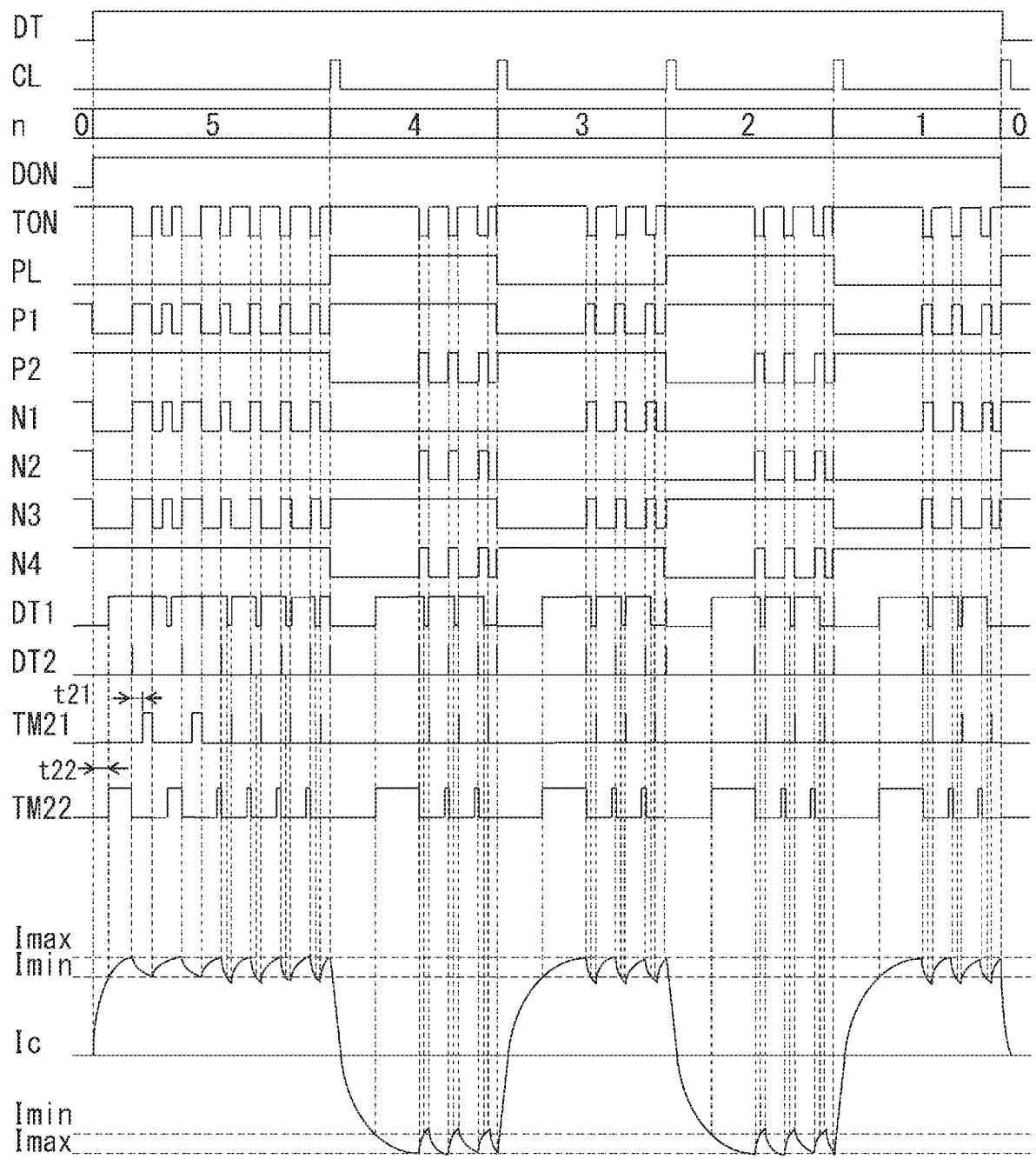
FIG. 14 is a timing chart illustrating an operation in the motor control process according to the third embodiment.

As illustrated in FIG. 14, there is a case where a wrong determination is least likely to be performed even if the inhibition time t23 is not set since an ON period of the driver 51 is gradually shortened depending on settings such as the type of motor 13 or rotational moment of a driven pointer. In this case, the motor control circuit 30C may be used instead of the motor control circuit 30B.

Effects of Third Embodiment

According to the third embodiment, the same effects as those in the second embodiment can be achieved.

Compared with the motor control circuit 30B, the motor control circuit 30C is not required to be provided with the third timer 33B and the OR circuit 47B, and thus a circuit configuration can be simplified, and cost can be reduced.

Fourth Embodiment

Next, a fourth embodiment of the present disclosure will be described with reference to FIGS. 15 to 18.

Figure 15:
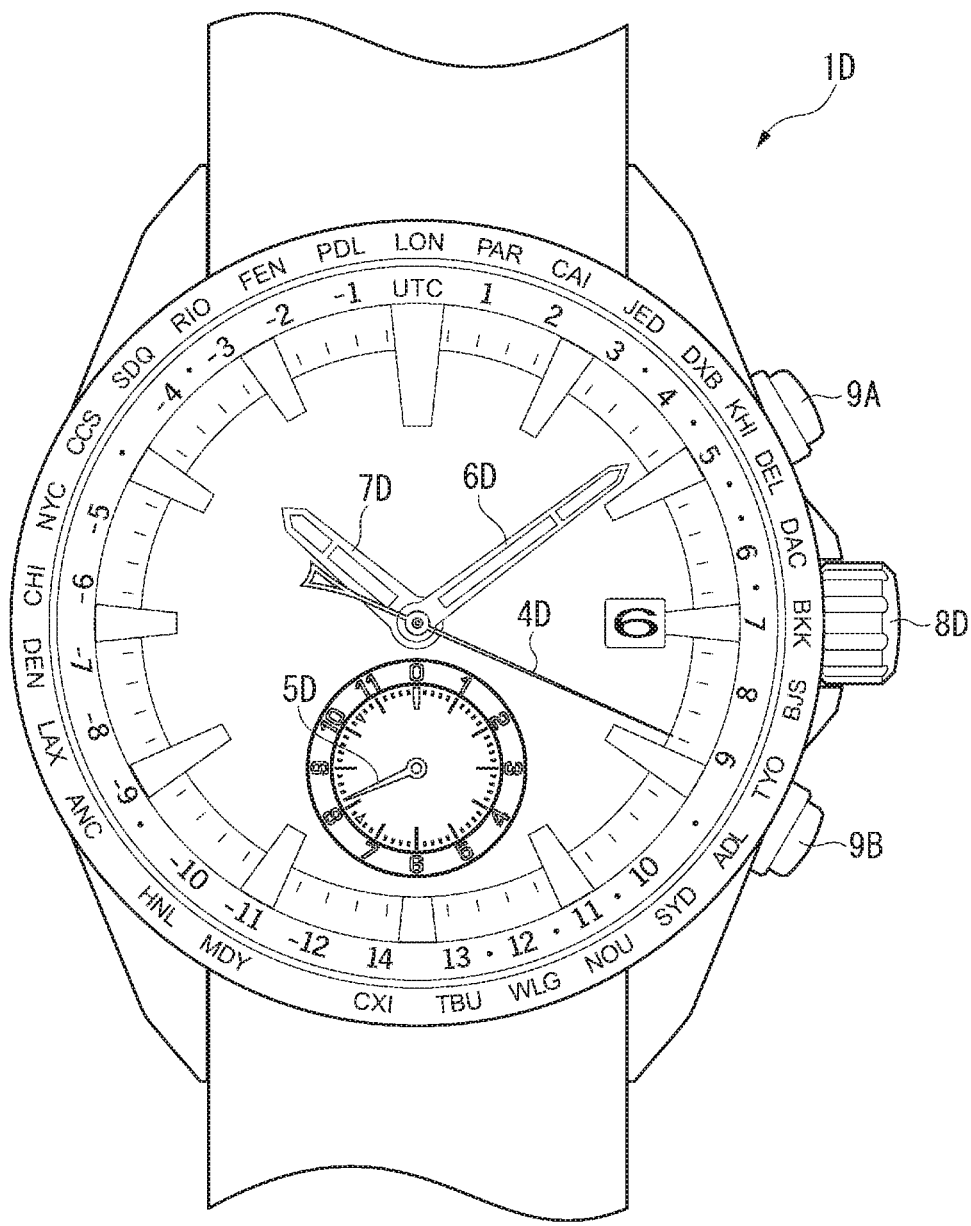
FIG. 15 is a front view illustrating an electronic timepiece of a fourth embodiment.

An electronic timepiece 1D of the fourth embodiment is an analog electronic timepiece having a universal time function as illustrated in FIG. 15. The electronic timepiece 1D includes a minute hand 6D and an hour hand 7D which are center hands, a second hand 5D disposed on the six o'clock side, a city hand 4D indicating a time zone, a crown 8D, and buttons 9A and 9B.

Figure 16:
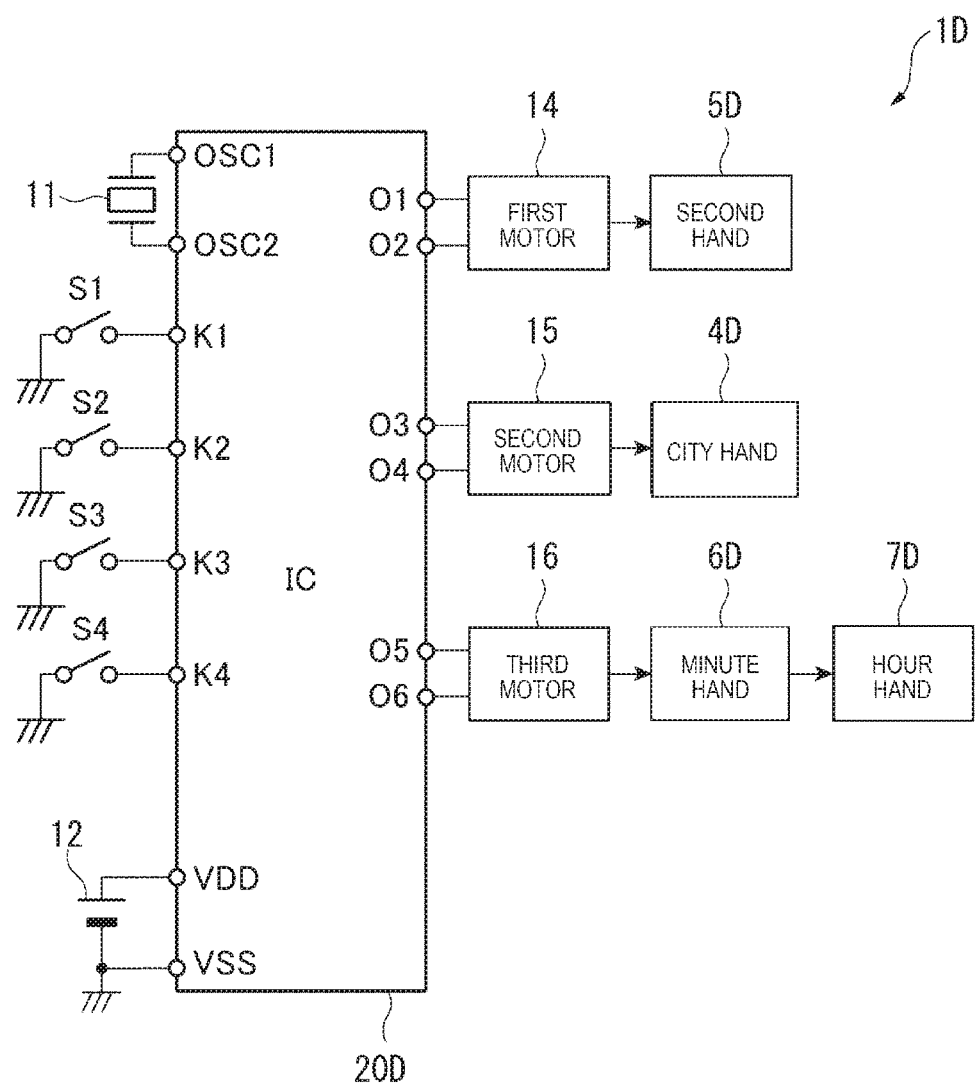
FIG. 16 is a circuit diagram illustrating a circuit configuration of the electronic timepiece according to the fourth embodiment.

As illustrated in FIG. 16, in the same manner as the electronic timepiece 1 of the first embodiment, the electronic timepiece 1D includes a quartz crystal resonator 11 which is a signal source, a battery 12 which is a power source, push switches S1 and S2 which are turned on and off in conjunction with an operation on the buttons 9A and 9B, switches S3 and S4 which are turned on and off in conjunction with an extraction operation on the crown 8D, and a first motor 14, a second motor 15, a third motor 16, and an IC 20D for the timepiece.

The first motor 14, the second motor 15, and the third motor 16 are the same stepping motors as the motor 13 of the first embodiment, and thus a description thereof will be omitted.

The second hand 5D is moved by the first motor 14, and indicates a second of a time point. The city hand 4D is moved by the second motor 15, and indicates a representative city of a set time zone.

The minute hand 6D and the hour hand 7D are moved by the third motor 16 in conjunction with each other. Thus, the minute hand 6D displays a minute in 180 divisions per turn, and the hour hand 7D displays an hour in 2160 divisions per turn.

As illustrated in FIG. 16, the IC 20D has connection terminals OSC1 and OSC2 connected to the quartz crystal resonator 11, input/output terminals K1 to K4 connected to the switches S1 to S4, power source terminals VDD and VSS connected to the battery 12, and the output terminals O1 to O6 connected to the coils 130 of the motors 14 to 16.

Circuit Configuration of IC

Figure 17:
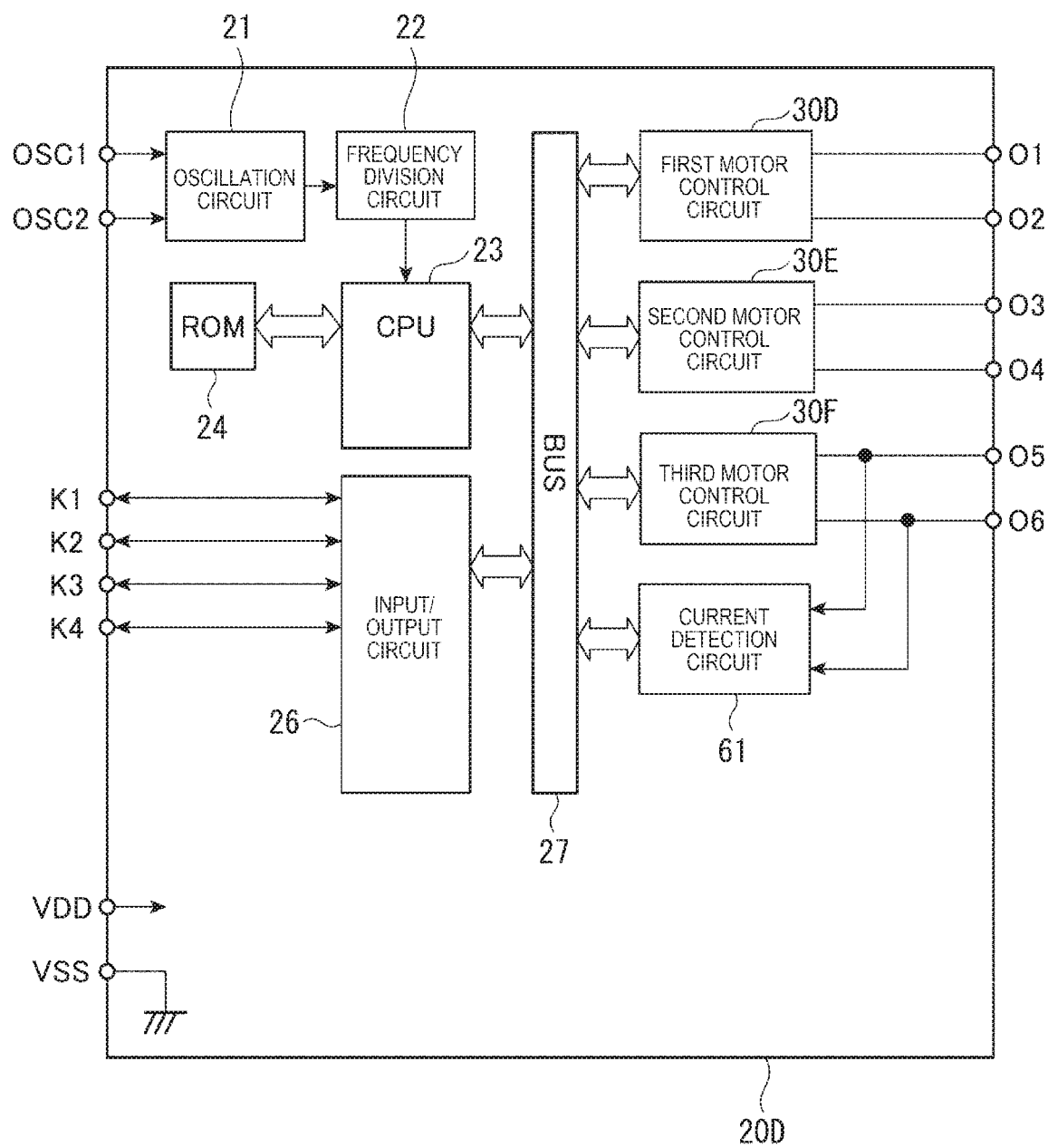
FIG. 17 is a circuit diagram illustrating a configuration of an IC of the electronic timepiece according to the fourth embodiment.

As illustrated in FIG. 17, the IC 20D includes an oscillation circuit 21, a frequency division circuit 22, a CPU 23 for control of the electronic timepiece 1D, a ROM 24, an input/output circuit 26, and a bus 27. The IC 20D includes a first motor control circuit 30D driving the first motor 14, a second motor control circuit 30E driving the second motor 15, a third motor control circuit 30F driving the third motor 16, and a current detection circuit 61.

The oscillation circuit 21, the frequency division circuit 22, the CPU 23, the ROM 24, the input/output circuit 26, and the bus 27 have the same configurations as those in the first embodiment.

The first motor control circuit 30D drives the first motor 14 every second, and is thus configured with a control circuit capable of achieving low power consumption, employed in a wristwatch or the like. In other words, the first motor control circuit 30D performs control in which a main drive pulse having a small pulse width is output, then an induced voltage of the coil 130 of the first motor 14 is measured, so that it is detected whether or not the rotor 133 is being rotated, and, in a case where the rotor 133 is not rotated, a correction drive pulse (fixed pulse) fixed to a pulse width larger than that of the main drive pulse is output such that the rotor 133 is reliably rotated.

Here, in a case where an external magnetic field is not detected, the first motor control circuit 30D performs low power consumption drive control of outputting the main drive pulse so as to detect rotation, and outputting the correction drive pulse in a case where rotation is not detected. In a case where an external magnetic field is detected, the first motor control circuit 30D reliably rotates the rotor 133 by outputting the correction drive pulse (fixed pulse) instead of the main drive pulse. In this case, it is not necessary to detect rotation of the rotor 133.

The second motor control circuit 30E drives the second motor 15 with a fixed pulse to be normally rotated and reversely rotated.

In the electronic timepiece 1D, in a case where the button 9A is pushed, the second motor control circuit 30E causes the city hand 4D to be moved in a normal rotation direction (clockwise direction), and to indicate a city name of the next time zone. In a case where the button 9B is pushed, the second motor control circuit 30E causes the city hand 4D to be moved in a reverse rotation direction (counterclockwise direction), and to indicate a city name of the next time zone.

A time zone is typically set every hour, and, thus, whenever the buttons 9A and 9B are pushed, the time zone is changed every hour. A time zone which is not set every hour may be present, such as India which is set in a time zone of +5.5 hours with respect to UTC. In this case, when the buttons 9A and 9B are pushed, the next time zone of a set time zone may be selected.

The third motor control circuit 30F includes the same driver 51 as in each of the first to third embodiments. However, the motor control circuits 30, 30B, and 30C of the embodiments include the logic circuits driving the transistors 52 to 57 of the driver 51, but, in the present embodiment, the logic circuits driving the transistors 52 to 57 of the driver 51 are not provided. In the present embodiment, the CPU 23 directly controls the transistors 52 to 57 via the bus 27, so as to control driving of the third motor 16. Thus, in the fourth embodiment, the CPU 23 configures a drive control unit, a polarity switching unit, and a drive stopping unit.

The current detection circuit 61 is provided along with the third motor control circuit 30F. The current detection circuit 61 has the same configuration as that in each of the embodiments.

The outputs DT1 and DT2 as detection results in the current detection circuit 61 are detected by the CPU 23 via the bus 27, and the CPU 23 controls the driver 51 of the third motor control circuit 30F according to the outputs DT1 and DT2.

The third motor control circuit 30F drives the third motor 16 to move the hands every 20 seconds during normal hand movement. In this case, the minute hand 6D is moved by 2 degrees (=360/180), and the hour hand 7D is moved by ⅙ degrees (=360/2160).

During a time zone changing operation using the buttons 9A and 9B, the third motor control circuit 30F moves the minute hand 6D and the hour hand 7D according to a changed time zone. For example, in a case where a time zone advances by an hour by using the button 9A, the minute hand 6D and the hour hand 7D are moved by +60 minutes in conjunction therewith.

Next, a description will be made of an operation of the electronic timepiece 1D of the fourth embodiment with reference to a flowchart in FIG. 18.

In a case where an input from the switch S1 connected to the input/output terminal K1 of the IC 20D is detected according to a push operation on the button 9A, the CPU 23 outputs a drive pulse from the second motor control circuit 30E, so as to subject the city hand 4D to one-step normal rotation (rightward rotation corresponding to a clockwise direction) (SD1). In this case, in conjunction with the movement of the city hand 4D, the CPU 23 sets a completion number of steps which is a total number of steps until driving of the minute hand 6D and the hour hand 7D is completed, and initializes a variable n for counting the number of steps to 0.

For example, in a case where the city hand 4D indicates a time zone as a result of advancing by one hour, the CPU 23 sets the completion number of steps to 180 which is the number of steps for moving the minute hand 6D and the hour hand 7D by +60 minutes. In a case where the city hand 4D indicates a time zone as a result of advancing by thirty minutes, the CPU 23 sets the completion number of steps to 90.

In a case where the city hand 4D indicates a time zone as a result of returning by one hour, the CPU 23 sets the completion number of steps to 1980 (=180×11). In the present embodiment, since the minute hand 6D and the hour hand 7D driven by the third motor control circuit 30F are set to be movable only in the normal rotation direction, in a case where the city hand 4D is returned by one hour, the minute hand 6D and the hour hand 7D are moved in the normal rotation direction by eleven hours due to the twelve-hour clock.

Next, the CPU 23 starts fast-forward control of the minute hand 6D and the hour hand 7D (SD2), and turns on the driver 51 of the third motor control circuit 30F for the minute and hour hands (SD3).

The CPU 23 determines whether or not a predetermined time t41 has elapsed from turning-on of the driver 51 (SD4). The predetermined time t41 is used to set the minimum time of an ON time in the same manner as the predetermined time t1 of the first embodiment, and is set to, for example, 50 µsec. In a case where a determination result in SD4 is NO, the CPU 23 continuously performs the determination process in SD4.

In a case where a determination result in SD4 is YES, the CPU 23 detects the current I flowing through the coil 130 with the current detection circuit 61, and determines whether or not the current I is more than the upper limit current value Imax (SD5). In a case where a determination result in SD5 is NO, the CPU 23 continuously performs the determination process in SD5.

In a case where a determination result in SD5 is YES, the CPU 23 turns off the driver 51 (SD6).

The CPU 23 determines whether or not a predetermined time t42 has elapsed from turning-off of the driver 51 (SD7). The predetermined time t42 is used to set the minimum time of an OFF time in the same manner as the predetermined time t21 of the second embodiment, and is set to, for example, 50 µsec. In a case where a determination result in SD7 is NO, the CPU 23 continuously performs the determination process in SD7.

In a case where a determination result in SD7 is YES, the CPU 23 determines whether or not the current I flowing through the coil 130 is less than the lower limit current value Imin (SD8). In a case where a determination result in SD8 is NO, the CPU 23 continuously performs the determination process in SD8.

In a case where a determination result in SD8 is YES, the CPU 23 determines whether a step is the first step after drive starting (SD9).

In a case where a determination result in SD9 is YES, the CPU 23 determines whether or not the number of times of switching between turning-on and turning-off of the driver 51 is equal to or more than five which is a predetermined number of times (SD10). In the present embodiment, due to starting from turning-on of the driver 51 in SD3, the CPU 23 determines that a result in SD10 is YES in a case where turning-on is performed twice, and turning-off is performed three times. The determination number in SD10 is used to set a period in which switching of a polarity of a drive signal is not performed in the same manner as the inhibition time t23 in SB5 of the second embodiment. Therefore, the determination number in SD10 is not limited to five, and may be set to a predetermined number according to characteristics of the motor 13 or loads (for example, rotational moment of a pointer).

In a case where a determination result in SD10 is NO, the CPU 23 repeatedly performs the processes in SD3 to SD10.

In a case where a determination result in SD9 is NO, and a determination result in SD10 is YES, the CPU 23 determines whether or not an OFF time until the current I is less than the lower limit current value Imin from turning-off of the driver 51 is longer than a time t43 (SD11). In the same manner as in the first embodiment, in a case where the rotor 133 is rotated by 180°, an OFF time of the driver 51 is lengthened.

Thus, in the present embodiment, in SD11, it is determined whether or not the OFF time is longer than the time t43, and thus it is determined whether or not the rotor 133 is rotated. Therefore, the time t43 is a first setting time for determining polarity switching in the same manner as the time t2, and is set, for example, 150 µsec.

In a case where a determination result in SD11 is NO, the CPU 23 repeatedly performs the processes in SD3 to SD11.

In a case where a determination result in SD11 is YES, the CPU 23 switches a polarity (SD12), and adds 1 to the number of steps n (SD13). The CPU 23 determines whether or not the number of steps n is the completion number of steps (for example, 180) (SD14), returns to SD3 in a case where a determination result in SD14 is NO, and continuously performs fast-forwarding of the minute hand 6D and the hour hand 7D. In a case where a determination result in SD14 is YES, the CPU 23 determines that fast-forwarding of the minute hand 6D and the hour hand 7D, corresponding to the change amount (for example, one hour) of the time zone, is finished, and finishes the driving.

Effects of Fourth Embodiment

According to the fourth embodiment, the same effects as those in the first to third embodiments can be achieved.

In other words, since the motor control circuit 30D performs control such that an ON time of the driver 51 is equal to or longer than the predetermined time t41, and an OFF time thereof is equal to or longer than the predetermined time t42, the frequency of turning-on and turning-off of the driver 51 can be reduced, and thus current consumption can be reduced.

In the same manner as in the first embodiment, a polarity switching timing can be determined on the basis of only a determination of whether or not an OFF time of the driver 51 is longer than the first setting time t43, and thus drive control for the driver 51 can be easily performed.

Since the determination process in SD10 is performed in the first step, it is possible to prevent a wrong polarity switching process from being performed right after driving is started.

The motor control circuit 30D can be easily configured since the CPU 23 controls the driver 51 without using a dedicated logic circuit performing drive control for the driver 51.

Fifth Embodiment

Next, a description will be made of a fifth embodiment of the present disclosure with reference to FIG. 19.

In the fifth embodiment, a control flow in the electronic timepiece 1D of the fourth embodiment is changed. Therefore, a configuration or the like of the electronic timepiece 1D is the same as that in the fourth embodiment, and thus a description thereof will be omitted.

Figure 19:
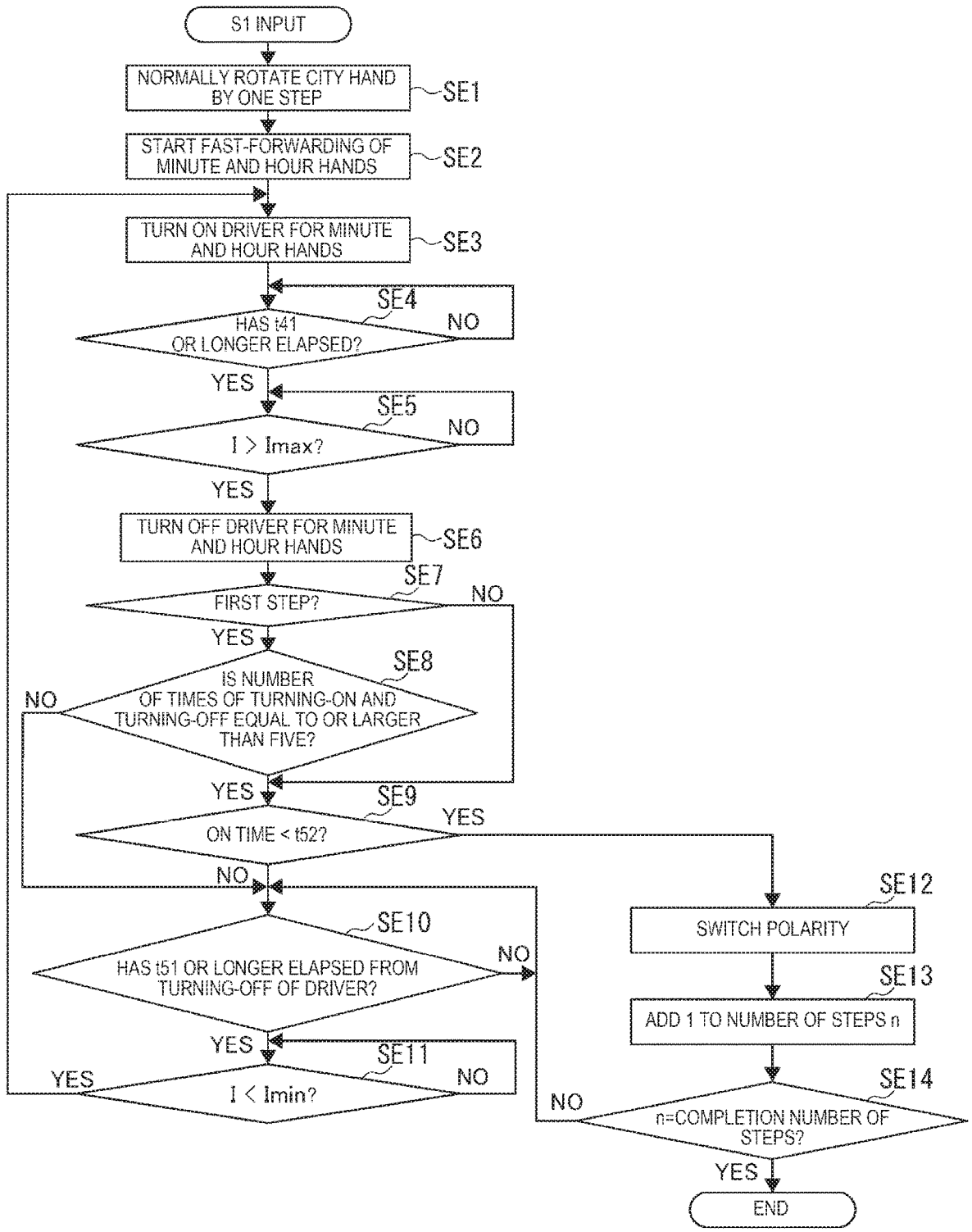
FIG. 19 is a flowchart illustrating the motor control process according to the fifth embodiment.

As illustrated in FIG. 19, the fifth embodiment is different from the fourth embodiment in that a polarity is switched in a case where an ON time of the driver 51 is shorter than a time t52.

Figure 18:
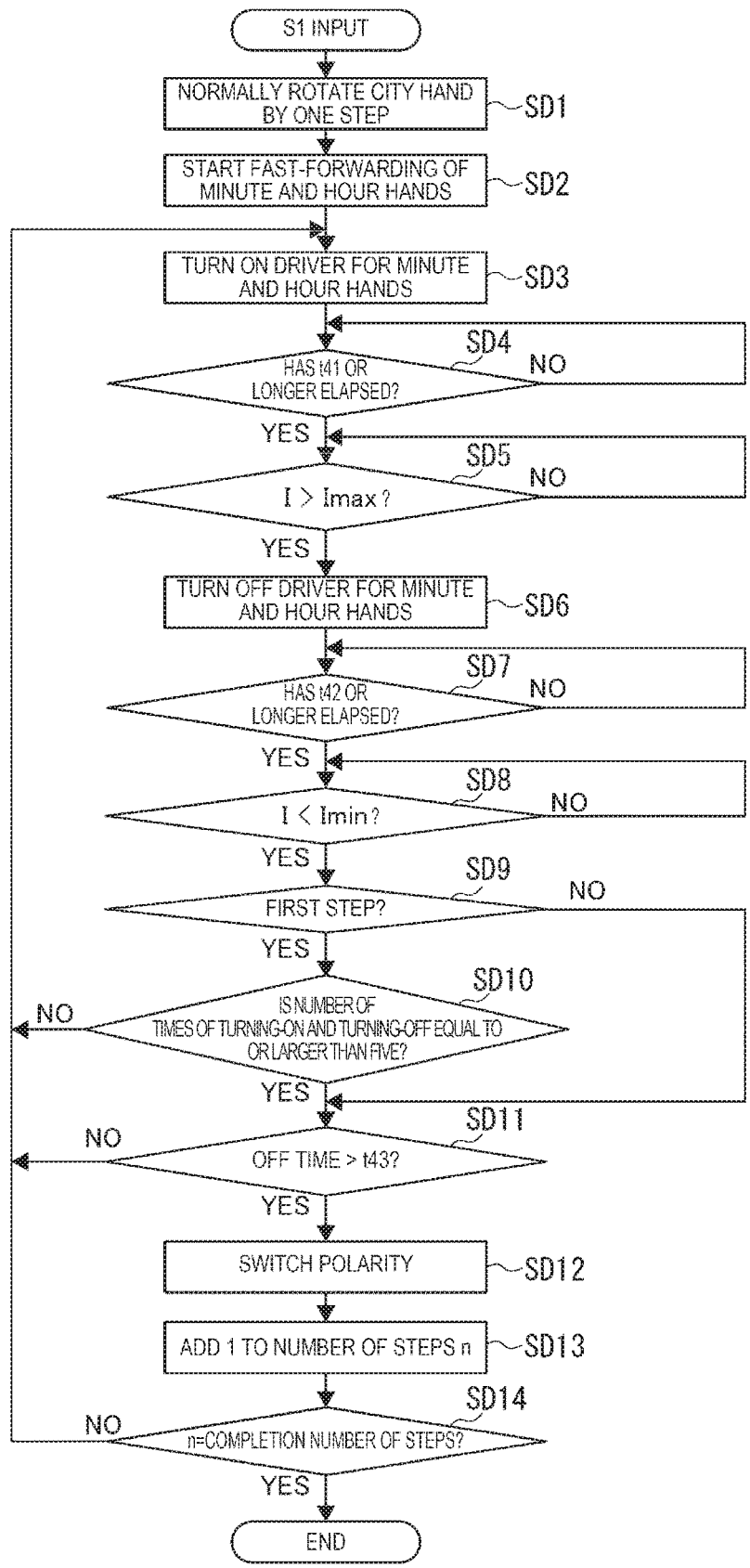
FIG. 18 is a flowchart illustrating a motor control process according to the fourth embodiment.

Thus, fast-forwarding control for the minute and hour hands in FIG. 19 (SE1 to SE6) is the same as the control in SD1 to SD6 in the fourth embodiment illustrated in FIG. 18, and is thus given the same reference sign, and a description thereof will be omitted.

In the fifth embodiment, the driver 51 for the minute and hour hands is turned off, then it is determined whether or not a step is the first step (SE7), and it is determined whether or not the number of times of switching between turning-on and turning-off of the driver 51 is five or more (SE8) in a case where a determination result in SE7 is YES. The processes in SE7 and SE8 are performed to set an inhibition period for a polarity switching process in the first step to which a load for starting driving is applied in the same manner as the processes in SD9 and SD10 of the fourth embodiment.

In a case where a determination result in SE7 is NO, and a determination result in SE8 is YES, the CPU 23 determines whether or not an ON time until the current I exceeds the upper limit current value Imax from turning-on of the driver 51 is shorter than a time t52 (SE9). In the same manner as the time t22 of the second embodiment, the time t52 is a second setting time for determining whether or not the rotor 133 is rotated by 180°, that is, a polarity switching condition is satisfied.

In a case where a determination result in SE9 is NO, and a determination result in SE8 is NO, the CPU 23 determines whether or not a predetermined time t51 or long has elapsed from turning-off of the driver 51 (SE10) in the same manner as in the second and third embodiments. In a case where a determination result in SE10 is NO, the determination in SE10 continuously waits until the time t51 elapses.

In a case where a determination result in SE10 is YES, the CPU 23 determines whether or not the current I is less than the lower limit current value Imin (SE11). In a case where a determination result in SE11 is NO, the determination in SE11 continuously waits.

In a case where a determination result in SE11 is YES, the CPU 23 turns on the driver 51 (SE3). Hereinafter, the CPU 23 repeatedly performs SE3 to SE11 until a determination result in SE9 is YES.

In a case where a determination result in SE9 is YES, the CPU 23 switches a polarity (SE12), and adds 1 to the number of steps n (SE13). The CPU 23 determines whether or not the number of steps n is the completion number of steps (for example, 180) (SE14), returns to SE10 in a case where a determination result in SE14 is NO, and continuously performs fast-forwarding of the minute hand 6D and the hour hand 7D. In a case where a determination result in SE14 is YES, the CPU 23 determines that fast-forwarding of the minute hand 6D and the hour hand 7D, corresponding to the change amount (for example, one hour) of the time zone, is finished, and finishes the driving.

Effects of Fifth Embodiment

According to the fifth embodiment, the same effects as those in the fourth embodiment or the second embodiment can be achieved.

Other Embodiments

The present disclosure is not limited to the above embodiments, and modifications, alterations, and the like within the scope of the present disclosure capable of realizing some aspects of the embodiments are included in the present disclosure.

For example, an inhibition period for a polarity switching process may also be set in the first embodiment. In the second to fifth embodiments, an inhibition period for a polarity switching process may not be set. In other words, the presence or absence of an inhibition period may be set according to characteristics or the like of a control target motor.

In the above-described respective embodiments, the electronic timepiece 1 is of a wristwatch type but may be, for example, a table clock. The motor control circuit of the embodiments of the present disclosure is not limited to controlling a motor driving a pointer of a timepiece, and may be applied to a control circuit or the like for a motor for a pointer indicating a measured value in each of various meters.

What is claimed is:

1. A movement comprising:
   a motor having a coil and a rotor;
   a driver that has an ON state and an OFF state, and outputs a drive signal to the coil so as to drive the motor and rotate the rotor;
   a lower limit detector that detects that a current flowing through the coil, in response to the drive signal, is less than a lower limit while the rotor rotates one step;
   an upper limit detector configured to determine whether a current flowing through the coil in response to the drive signal is more than an upper limit, wherein the upper limit detector (i) detects the current flowing through the coil during rotation of the rotor and at a same time that the rotor is being rotated one step and (ii) compares the current detected during the rotation of the rotor to the upper limit;
   a drive controller that brings the driver into the ON state when the lower limit detector detects that the current flowing through the coil is less than the lower limit after a predetermined time elapses from the driver being brought into the OFF state, and brings the driver into the OFF state when the upper limit detector detects that the current flowing through the coil is more than the upper limit after the driver is brought into the ON state;
   a timer configured to measure an ON time indicating an elapsed time from the driver being brought into the ON state; and
   a polarity switcher configured to switch a polarity of the drive signal in response to a determination that both (i) the current is less than the lower limit and (ii) the ON time satisfies a polarity switching condition indicated by the measured ON time being less than a predetermined set time,
   wherein the polarity switcher determines that the polarity switching condition is satisfied when the ON time is shorter than a setting time.

2. An electronic timepiece comprising:
   a casing; and
   the movement according to claim 1 housed within the casing.

3. A movement comprising:
   a motor having a coil and a rotor;
   a driver that has an ON state and an OFF state, and outputs a drive signal to the coil so as to drive the motor and rotate the rotor;
   a lower limit detector that detects that a current flowing through the coil, in response to the drive signal, is less than a lower limit while the rotor rotates one step;
   an upper limit detector configured to determine whether a current flowing through the coil in response to the drive signal is more than an upper limit, wherein the upper limit detector (i) detects the current flowing through the coil during rotation of the rotor and at a same time that the rotor is being rotated one step and (ii) compares the current detected during the rotation of the rotor to the upper limit;
   a drive controller that brings the driver into the ON state when the lower limit detector detects that the current flowing through the coil is less than the lower limit after a predetermined time elapses from the driver being brought into the OFF state, and brings the driver into the OFF state when the upper limit detector detects that the current flowing through the coil is more than the upper limit after the driver is brought into the ON state;
   a timer configured to measure an ON time indicating an elapsed time from the driver being brought into the ON state; and
   a polarity switcher configured to switch a polarity of the drive signal in response to a determination that both (i) the current is less than the lower limit and (ii) the ON time satisfies a polarity switching condition indicated by the measured ON time being less than a predetermined set time,
   wherein the polarity switcher does not switch a polarity of the drive signal when an elapsed time from a driving start time is shorter than a predetermined time, or a number of times of switching between the ON state and the OFF state of the driver from the driving start time is smaller than a predetermined number of times.

4. A movement comprising:
   a motor having a coil and a rotor;
   a driver that has an ON state and an OFF state, and outputs a drive signal to the coil so as to drive the motor and rotate the rotor;
   a lower limit detector that detects that a current flowing through the coil, in response to the drive signal, is less than a lower limit while the rotor rotates one step;
   an upper limit detector configured to determine whether a current flowing through the coil in response to the drive signal is more than an upper limit, wherein the upper limit detector (i) detects the current flowing through the coil during rotation of the rotor and at a same time that the rotor is being rotated one step and (ii) compares the current detected during the rotation of the rotor to the upper limit;
   a drive controller that brings the driver into the ON state when the lower limit detector detects that the current flowing through the coil is less than the lower limit after a predetermined time elapses from the driver being brought into the OFF state, and brings the driver into the OFF state when the upper limit detector detects that the current flowing through the coil is more than the upper limit after the driver is brought into the ON state;
   a timer configured to measure an ON time indicating an elapsed time from the driver being brought into the ON state; and
   a polarity switcher configured to switch a polarity of the drive signal in response to a determination that both (i) the current is less than the lower limit and (ii) the ON time satisfies a polarity switching condition indicated by the measured ON time being less than a predetermined set time,
   wherein the polarity switcher does not switch a polarity of the drive signal when an elapsed time from a polarity switching time is shorter than a predetermined time, or a number of times of switching between the ON state and the OFF state of the driver from the polarity switching time is smaller than a predetermined number of times.

5. A driving method for a stepping motor for an electronic watch, the electronic watch including the stepping motor including a coil and a rotor and a driver controlled to an ON state for supplying a driving current to the coil and to an OFF state for not supplying the driving current, the driving method comprising:

using a drive controller, a first controlling step that brings the driver to the ON state;

using an upper limit detector, a first detecting step that detects a current flowing through the coil being greater than an upper limit during the ON state after a predetermined time elapses from the driver being brought into the ON state in the first controlling step;

using the drive controller, a second controlling step that brings the driver to the OFF state based on the current flowing through the coil being greater than the upper limit during the ON state in the first detecting step;

using a lower limit detector, a second detecting step that detects the current flowing through the coil being lower than a lower limit during the OFF state;

using a timer, a measuring step that measures an OFF time, the OFF time being measured from when the driver is brought to the OFF state in the second controlling step until being detected in the second detecting step;

using a polarity switcher, a determining step that determines whether the OFF time satisfies a polarity switching condition indicated by the measured OFF time being greater than a predetermined set time;

when the OFF time does not satisfy the polarity switching condition in the determining step, repeating a process from the first controlling step to the determining step in a same polarity until the OFF time satisfies the polarity switching condition; and when the OFF time satisfies the polarity switching condition in the determining step, switching to a next polarity and repeating a process from the first controlling step to the determining step in the next polarity.

6. A driving method for a stepping motor for an electronic watch, the electronic watch including the stepping motor including a coil and a rotor and a driver controlled to an ON state for supplying a driving current to the coil and to an OFF state for not supplying the driving current, the driving method comprising:

using a driver controller, a first controlling step that brings the driver to the ON state;

using an upper limit detector, a first detecting step that detects a current flowing through the coil being greater than an upper limit during the ON state;

using the drive controller, a second controlling step that brings the driver to the OFF state based on the current flowing through the coil being greater than the upper limit during the ON state in the first detecting step;

using a timer, a measuring step that measures an ON time, the ON time being measured from when the driver is brought to the ON state in the first controlling step;

using a polarity switcher, a determining step that determines whether the ON time satisfies a polarity switching condition indicated by the measured ON time being less than a predetermined set time;

when the ON time does not satisfy the polarity switching condition in the determining step, (i) performing a second detecting step to detect whether the current flowing through the coil is less than a lower limit during the OFF state and (ii) repeating a process from the first controlling step to the determining step in a same polarity until the ON time satisfies the polarity switching condition; and when the ON time satisfies the polarity switching condition in the determining step, switching to a next polarity and repeating a process from the first controlling step to the determining step in the next polarity.

\* \* \* \* \*